US011402939B2

(12) United States Patent
Zhao et al.

(10) Patent No.: US 11,402,939 B2
(45) Date of Patent: Aug. 2, 2022

(54) ELECTRONIC DEVICE WITH GRIP-SENSOR LATCHING SYSTEM AND CORRESPONDING METHODS

(71) Applicant: Motorola Mobility LLC, Chicago, IL (US)

(72) Inventors: Hong Zhao, Naperville, IL (US); Nathaniel Mitchell, Chicago, IL (US); Nigil Valikodath, Elmhurst, IL (US)

(73) Assignee: Motorola Mobility LLC

( * ) Notice: Subject to any disclaimer, the term of this patent is extended or adjusted under 35 U.S.C. 154(b) by 0 days.

(21) Appl. No.: 16/667,649

(22) Filed: Oct. 29, 2019

(65) Prior Publication Data

US 2021/0124451 A1 Apr. 29, 2021

(51) Int. Cl.
| | |
|---|---|
| *G06F 3/0488* | (2022.01) |
| *G06F 3/041* | (2006.01) |
| *G06F 1/16* | (2006.01) |
| *G06F 3/14* | (2006.01) |
| *G06F 1/3206* | (2019.01) |

(52) U.S. Cl.
CPC ............ *G06F 3/0414* (2013.01); *G06F 1/169* (2013.01); *G06F 1/3206* (2013.01); *G06F 3/0488* (2013.01); *G06F 3/14* (2013.01)

(58) Field of Classification Search
CPC ...... G06F 3/0414; G06F 1/169; G06F 1/3206; G06F 3/0488; G06F 3/14
See application file for complete search history.

(56) References Cited

U.S. PATENT DOCUMENTS

| | | | | |
|---|---|---|---|---|
| 9,239,592 | B1* | 1/2016 | Liu | G06F 1/1681 |
| 9,389,644 | B2* | 7/2016 | Kim | G06F 1/1654 |
| 9,580,937 | B2* | 2/2017 | Aisaka | G06F 1/1616 |
| 9,626,029 | B2 | 4/2017 | Park et al. | |
| 10,019,562 | B2 | 7/2018 | Willis et al. | |
| 10,139,862 | B1* | 11/2018 | Nakamura | G06F 1/1669 |
| 2005/0073283 | A1 | 4/2005 | Friedli et al. | |
| 2014/0376181 | A1* | 12/2014 | Zhang | G06F 21/32 |
| | | | | 361/679.55 |
| 2015/0234771 | A1* | 8/2015 | Wu | G06F 1/1632 |
| | | | | 710/303 |
| 2015/0277492 | A1* | 10/2015 | Chau | G06F 1/1654 |
| | | | | 361/679.43 |
| 2016/0062411 | A1* | 3/2016 | Morrison | G06F 1/1632 |
| | | | | 361/679.08 |
| 2016/0062484 | A1* | 3/2016 | Sugiura | G06F 3/0202 |
| | | | | 345/156 |

(Continued)

OTHER PUBLICATIONS

"ThinkPad 433815U MiniDock Plus Series 3 with USB 3.0-90W", newegg Business; Viewed online on Oct. 29, 2019 at https://www.neweggbusiness.com/Product/Product.aspx?Item=9SIA4KB1F89819&ig.

*Primary Examiner* — Henry Tsai
*Assistant Examiner* — Harry Z Wang
(74) *Attorney, Agent, or Firm* — Philip H. Burrus, IV

(57) ABSTRACT

An electronic device includes a device housing and at least two grip sensors disposed along the device housing. One or more processors are operable with the at least two grip sensors. At least one electronic latch is operable with the one or more processors. The one or more processors transition the at least one electronic latch from a latched state to an unlatched state when the at least two grip sensors detect a grip applied to the at least two grip sensors.

20 Claims, 9 Drawing Sheets

(56) References Cited

U.S. PATENT DOCUMENTS

2016/0124569 A1\* 5/2016 Sunwoo ............ H04M 1/72527
            345/173
2017/0161221 A1\* 6/2017 Yakame .................. G06F 1/189
2018/0364763 A1   12/2018 Shim et al.

\* cited by examiner

US 11,402,939 B2

ELECTRONIC DEVICE WITH GRIP-SENSOR LATCHING SYSTEM AND CORRESPONDING METHODS

BACKGROUND

Technical Field

This disclosure relates generally to electronic devices, and more particularly to electronic devices having mechanical connectors.

Background Art

Modern portable electronic communication devices pack powerful computing power into very small packages. Illustrating by example, a modern smartphone has more computing power than even the most powerful desktop computer of only a few years ago.

As the computing power in these devices has increased, so too has their feature set. While mobile phones used to be only for making voice calls, today they are used to monitor health and wellness records, transact with social media, make financial transactions, maintain calendars, surf the web, and more.

This increased functionality can create issues for designers of these devices. For instance, it can be challenging to optimally locate displays, loudspeakers, microphones, and other user interface components for optimal performance in all conditions. It would be advantageous to have an improved electronic device that could be reconfigured to customize the feature set.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
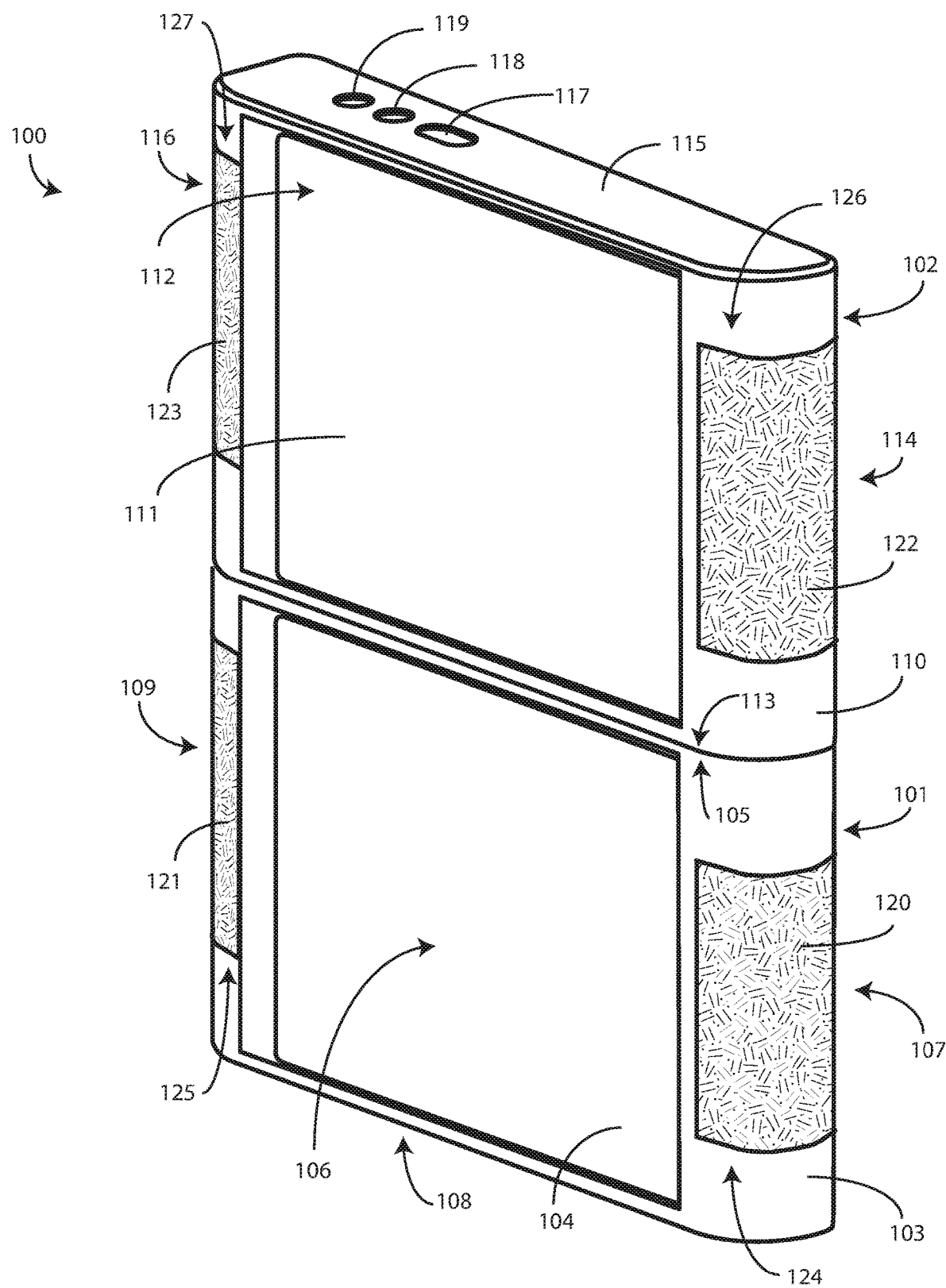
FIG. 1 illustrates a perspective view of one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically.

Also, reference designators shown herein in parenthesis indicate components shown in a figure other than the one in discussion. For example, talking about a device (10) while discussing figure A would refer to an element, 10, shown in figure other than figure A. Further, it is expected that one of ordinary skill, notwithstanding possibly significant effort and many design choices motivated by, for example, available time, current technology, and economic considerations, when guided by the concepts and principles disclosed herein will be readily capable of electronic devices, modular systems, and attachments in accordance with embodiments of the disclosure with minimal experimentation.

Embodiments of the disclosure contemplate that the increased functionality of modern portable electronic devices can create issues for designers, in that it can be challenging to optimally locate user interface components such as displays, loudspeakers, microphones, and imagers. Illustrating by example, people generally desire large, expansive displays for watching movies, sports, or playing games. This desire can create design issues, as a large display defining a major face of the electronic device leaves little room for other components such as loudspeakers, microphones, and other input and output components on the same side of the device. Additionally, people sometimes want to carry only a small device with basic functionality. At other times they prefer to use a larger, full-featured device.

Placement of accessory devices, such as loudspeakers and microphones, on the rear side of a device can sometimes be problematic. This could be true, for example, when a thin, flat, electronic device has a loudspeaker on its rear surface and is lying flat on a table. Output of that loudspeaker may be sub-optimal due to the acoustic interference occurring between the device housing and the table. However, at other times it may be desirable to have a loudspeaker on the rear side of the device. If a person is capturing video with a rear-facing camera of a person dancing, for instance, it may be not only desirable, but also actually preferable to have the loudspeaker on the rear surface of the electronic device so the person dancing can hear the music.

Embodiments of the disclosure advantageously provide a solution to this issue by providing a system that includes an electronic device that is selectively attachable to another electronic device or an attachment that is operable with the electronic device. In one or more embodiments, a latching system between the electronic device and another companion device is responsive to one or more grip sensors. Rather than having to physically manipulate a detent or snap or press a button, in one or more embodiments a user simply grasps the electronic device when attached to a companion device to release a latch. Similarly, when the electronic device is decoupled from the companion device, the user simply presses them together to form a robust and reliable mechanical (and optionally electrical) connection between the two.

In one or more embodiments, an electronic device includes a device housing. At least two grip sensors are disposed or otherwise situated along the device housing. Examples of grip sensors include inductive touch sensors, capacitive touch sensors, pressure sensors, and force sensors. Other examples of grip sensors will be described below. Still others will be obvious to those of ordinary skill in the art having the benefit of this disclosure.

In one or more embodiments, one or more processors are operable with the at least two grip sensors. At least one electronically controllable latch is operable with the one or more processors. In one or more embodiments, the one or more processors transition the electronically controllable latch from a latched state to an unlatched state when the at least two grip sensors detect a grip being applied to the at least to grip sensors.

In one or more embodiments, an attachment, which can be another electronic device, a companion device, an accessory operable with an electronic device, or another type of device, also includes at least two other grip sensors. In one or more embodiments, the one or more processors only transition the electronically controllable latch, referred to herein as an "electronic latch," from the latched state to the unlatched state when both the at least two grip sensors of the electronic device detect a first grip being applied to the at least two grip sensors of the electronic device and the at least two other grip sensors of the attachment detect a second grip being applied to the at least two other grip sensors of the attachment. Accordingly, when the attachment is coupled to the electronic device, a user may simply grasp the electronic device with one hand and the attachment with the other to cause the electronic latch(es) to transition from the latches state to the unlatched state.

In one or more embodiments, one or both of the electronic device and the attachment include an attachment sensor operable with the one or more processors. Examples of attachment sensors include proximity sensors, Hall effect sensors, infrared sensors, capacitive sensors, or electronic communication circuits. Other examples of attachment sensors will be described below. Still others will be obvious to those of ordinary skill in the art having the benefit of this disclosure.

In one or more embodiments, the attachment sensor detects when the electronic device, or the attachment, attaches to another device. In one or more embodiments, when the attachment sensor detects the initial attachment of a device to another device, the one or more processors transition the electronic latch from the unlatched to the latched state to form a robust and reliable mechanical (and optionally electrical) connection between the two.

In one or more embodiments, the latching system of the electronic device is symmetrical. Where so configured, this symmetry allows an electronic device accessory configured as an electronic device attachment to be reversibly connected to electronic device such that the front side of the attachment faces in a first direction when the attachment is coupled to the electronic device in a first configuration, with that same front side facing a second direction when the attachment is coupled to the electronic device in a second configuration. Advantageously, if the front side of the attachment includes a loudspeaker, attaching the attachment to the electronic device in a first configuration allows the loudspeaker to be on the front side of the assembly, while attaching the attachment to the electronic device in a second configuration causes the loudspeaker to be on the rear side of the electronic device.

Advantageously, this reversibility allows for greater system functionality. Illustrating by example, consider the situation where an attachment includes a display on the front major face and a camera on the rear major face. Assuming the electronic device has a display on its major face, one can couple the attachment to the electronic device in the first configuration such that the display of the electronic device and the display of the attachment are arranged side-by-side. One or more processors within the electronic device can then use this "second" display of the attachment in unison with the display of the electronic device to create a larger overall display presentation area.

By contrast, when the attachment is coupled to the electronic device in the second configuration, the imager of the attachment is adjacent to the display of the electronic device. This allows the person to take "selfies," engage in video conferences, and perform other operations with the imager that would not be possible with the imager permanently situated on the rear face of the combined device. Advantageously, simply by "flipping" the accessory around, the person has the option of having an enlarged display at some times and a front-facing camera at others.

Embodiments of the disclosure offer other advantages as well. In one or more embodiments, when no attachment is coupled to an electronic device, the physical form factor of the system is reduced. This advantageously allows a user to separate the electronic device from the attachment and employ only the electronic device as a "miniature" version. However, by reattaching the attachment, the person could use an expanded display, additional cameras or microphones, additional loudspeakers, and so forth. These features can be added or removed as desired simply by attaching or removing an attachment from the electronic device. Still other advantages of embodiments of the disclosure will be described below. Still others will be obvious to those of ordinary skill in the art having the benefit of this disclosure.

Turning now to FIG. 1, illustrated therein is one explanatory system 100 configured in accordance with one or more embodiments of the disclosure. As shown in FIG. 1, in one or more embodiments the system 100 includes an electronic device 101 coupled to an attachment 102. In one or more embodiments, the attachment 102 can be selectively attached to, or detached from, the electronic device 101 or an electronic device module.

The electronic device 101 of FIG. 1 is shown as a portable electronic device. In one or more embodiments, the electronic device 101 is capable of operating as a stand-alone electronic device when no attachment 102 is coupled to the electronic device 101. However, in other embodiments, the electronic device 101 is selectively attachable and detachable from one or more attachments, configured as device accessories, which provide secondary functionality such as delivery of acoustic output, visual output, or other output. Where attachable and detachable from the attachment 102, the combination of the electronic device 101 and the attachment 102 form a system 100 that is modular.

The electronic device 101 of FIG. 1 is shown illustratively as a smartphone. For simplicity, this embodiment will be described as an illustrative example. However, the electronic device 101 can take other forms as well, including as a palm top computer, a gaming device, a laptop computer, a multimedia player, and so forth. Still other examples of electronic devices will be obvious to those of ordinary skill in the art having the benefit of this disclosure.

Similarly, the attachment 102 can take various forms as well. Illustrating by example, in one or more embodiments the attachment 102 is simply another electronic device, such as another smartphone. However, in other embodiments the attachment 102 can be a companion electronic device that is operable with the electronic device 101, an accessory operable with an electronic device 101, or another type of device. Thus, the attachment 102 can likewise be a palm top computer, a gaming device, a laptop computer, a multimedia player, or can alternatively be a device that provides additional functionality for the electronic device 101 when coupled thereto.

In one or more embodiments, the electronic device 101 includes a device housing 103. The device housing 103 can include one or more housing portions, such as a first housing portion and a second housing portion, e.g., a front housing portion coupled to a rear housing portion. In this illustrative embodiment, the device housing 103 is disposed about the periphery of a display 104, thereby defining a front major face 106 of the electronic device 101. The rear side of the electronic device 101 defines a rear major face of the electronic device 101. In one or more embodiments, the front major face 106 of the electronic device 101 is separated from the rear major face of the electronic device 101 by one or more minor faces 105, 107, 108, 109 of the device housing 103.

In one or more embodiments, the attachment includes also an attachment housing 110. The attachment housing 110 can include one or more housing portions, such as a first housing portion and a second housing portion, e.g., a front housing portion coupled to a rear housing portion. In this illustrative embodiment, the attachment housing 110 is disposed about the periphery of a second display 111. The second display 111 is one example of an output device that the attachment housing 110 can support to provide additional functionality for the electronic device 101 when the attachment 102 is coupled to the electronic device 101. However, as will be described in more detail with reference to FIG. 2 below, the attachment 102 can support other output devices, loudspeakers, image capture devices, other input devices, energy storage devices, memory devices, or other components as well.

In one or more embodiments, the attachment 102 couples to the electronic device 101 along a minor face, e.g., minor face 105 in this illustrative example, of the device housing 103. In this illustrative embodiment, the attachment housing 110 and the second display 111 define a front major face 112 of the attachment 102. The rear side of the attachment 102 defines a rear major face of the attachment 102. In one or more embodiments, the front major face 112 of the attachment 102 is separated from the rear major face of the attachment 102 by one or more minor faces 113,114,115,116 of the attachment housing 110.

In one or more embodiments, the attachment 102 can be rotated 180 degrees prior to coupling the attachment 102 to the electronic device 101. In such an embodiment, this rotation would result in the back facing camera on the attachment housing 110 facing frontward, i.e., in the same direction of the display 104 of electronic device 101, thereby allowing selfies to be taken with a more powerful camera.

In one or more embodiments, at least one mechanical and electrical connector is coupled to the electronic device 101. In the illustrative embodiment of FIG. 1, one such connector is coupled only to minor face 105 of the electronic device 101. However, embodiments of the disclosure are not so limited. In some embodiments, two, three, or more connectors could be coupled to the minor faces 105,107,108,109 of the electronic device 101. Mechanical and electrical connectors could be coupled to major faces of the electronic device 101 as well. Examples of these electrical and mechanical connectors will be described in more detail below with reference to FIGS. 8-13. Still other examples will be obvious to those of ordinary skill in the art having the benefit of this disclosure.

In one or more embodiments, one or more user input devices 117,118,119 are positioned along an exterior of the attachment 102. In one or more embodiments, the one or more user input devices 117,118,119 are positioned along one a minor face 115 of the attachment 102. In one or more embodiments, the one or more user input devices 117,118, 119 are electrically coupled to one or more processors situated within the attachment housing 110. A user can deliver input and control commands to the one or more processors by interacting with the one or more user input devices 117,118,119 in one or more embodiments.

In this illustrative embodiment, the one or more user input devices 117,118,119 each comprise push buttons. However, embodiments of the disclosure are not so limited. In other embodiments, the one or more user input devices 117,118, 119 can comprise touch-sensitive surfaces. In other embodiments, the one or more user input devices 117,118,119 can comprise any of rockers, sliders, capacitive sensors, microphones, or other user input devices. Moreover, the one or more user input devices 117,118,119 can all be the same, or can be different. Illustrating by example, user input devices 118,119 can be push buttons while user input device 117 is a capacitive touch sensor. Alternatively, user input device 117 can be a push button, while user input device 118 is a microphone and user input device 118 is a touch sensor. Other configurations for the one or more user input devices 117,118,119 will be obvious to those of ordinary skill in the art having the benefit of this disclosure. The electronic device 101 can include user input devices in a similar fashion.

As will be described below with reference to FIG. 4, in one or more embodiments one or more electrical components are situated within the attachment housing 110. The one or more electrical components can provide attachment functionality. For instance, the attachment 102 of FIG. 1 includes a second display 111. Display drivers, filter circuits, energy storage devices, signal processors, and other components can be included within the attachment housing 110 so that visible output can be delivered by the second display 111. In one or more embodiments, electrical connectors can electrically couple the electronic device 101 and attachment 102 together so that signals for the second display 111 or other accessory components can be delivered to the attachment 102 by the electronic device 101.

In one or more embodiments, the electronic device 101 and the attachment 102 can include complementary or common components. For example, the electronic device 101 and attachment 102 may both include components for receiving user input, such as loudspeakers, microphones, earpiece speakers, and the like. When such components are included in the attachment 102 and the electronic device 101, a user can—for example—deliver voice input to a microphone disposed in the electronic device 101 or the attachment 102.

The attachment 102 can be equipped with additional features as well. Illustrating by example, while the attachment 102 of FIG. 1 includes a second display 111, in one or more embodiments the attachment 102 can include a camera or other device to enhance electronic device operation. The camera can be carried on the attachment housing 110 of the attachment 102 to provide an enhanced feature for the electronic device 101 in one or more embodiments. This example of a camera illustrates only one of many various options that can be included to provide various features and devices that can be incorporated into the attachment 102 beyond just the second display 111. Others will be described below with reference to FIG. 2. Numerous other various combinations and permutations of features to include within the attachment 102 beyond a second display 111, loudspeaker, or camera will be obvious to those of ordinary skill in the art having the benefit of this disclosure.

In one or more embodiments, the display 104 of electronic device 101 and the display 111 of attachment 102 can form a larger, effectively singular display for displaying a continuous content when the attachment 102 is attached to the electronic device 101. In one or more embodiments, the display 104 of electronic device 101 and the display 111 of the attachment 102 function independently in a multi window system. In one or more embodiments, the display 104 of electronic device 101 becomes a touch controller for the display 111 of the attachment 102 when the attachment 102 is attached to the electronic device 101, such as when being used as a game controller or soft input keyboard.

In one or more embodiments, the electronic device 101 includes at least two grip sensors 120,121 disposed along, coupled to, or situated on the device housing 103. While two grip sensors 120,121 are shown illustratively in FIG. 1, in other embodiments the electronic device 101 will include three, four, five, or more grip sensors.

In one or more embodiments, the at least two grip sensors 120,121 include a first grip sensor 120 and a second grip sensor 121. In this illustrative embodiment the first grip sensor 120 is situated at a first location 124 of the device housing 103, while the second grip sensor 121 is situated at a second location 125 of the device housing 103.

In this illustrative embodiment, the first grip sensor 120 and the second grip sensor 121 are physically separated from each other by at least a predefined distance. For example, in FIG. 1 minor face 107 is separated from minor face 109 by major face 106. In this illustrative embodiment, the first grip sensor 120 spans at least a portion of minor face 105, while the second grip sensor 121 spans at least a portion of the minor face 107. Accordingly, in this embodiment the first grip sensor 120 is separated from the second grip sensor 121 by the display 104. Additionally, the first grip sensor 120 is physically separated from the second grip sensor by a majority of major face 106. As will be described in more detail below with reference to FIG. 7, this physical separation of the at least two grip sensors 120,121 by the predefined distance confirms that a user is physically gripping the electronic device 101—rather than merely touching it—prior to transitioning an electronic latch from a latched state to an unlatched state.

In this illustrative embodiment, the attachment comprises at least two other grip sensors 122,123 disposed along, coupled to, or situated on the attachment housing 110. As with the two grip sensors 120,121, while only two other grip sensors 122,123 are shown illustratively in FIG. 1, in other embodiments the attachment 102 will include three, four, five, or more other grip sensors.

In one or more embodiments, the at least two other grip sensors 122,123 include a first other grip sensor 122 and a second other grip sensor 123. In this illustrative embodiment the first other grip sensor 122 is situated at a first location 126 of the attachment housing 110, while the second other grip sensor 123 is situated at a second location 127 of the attachment housing 110.

In this illustrative embodiment, the first other grip sensor 122 and the second other grip sensor 123 are physically separated from each other by at least a predefined distance. For example, in FIG. 1 minor face 114 is separated from minor face 116 by major face 112. In this illustrative embodiment, the first other grip sensor 122 spans at least a portion of minor face 116, while the second other grip sensor 123 spans at least a portion of the minor face 116.

Accordingly, in this embodiment the first other grip sensor 122 is separated from the second other grip sensor 123 by the second display 111. Additionally, the first other grip sensor 122 is physically separated from the second other grip sensor 123 by a majority of major face 112. As with the at least two grip sensors 120,121 of the device housing 103, this physical separation of the at least two other grip sensors 122,123 by the predefined distance confirms that a user is physically gripping the attachment 102—rather than merely touching it—prior to transitioning an electronic latch from a latched state to an unlatched state.

As will be described in more detail below with reference to FIG. 3, in one or more embodiments one or more processors or control circuits of the electronic device 101 are operable with the at least two grip sensors 120,121. Similarly, one or more processors or control circuits of the attachment 102 can be operable with the at least two other grip sensors 122,123. In one or more embodiments, at least one electronic latch carried by the electronic device 101 is operable with the one or more processors of the electronic device. The attachment 102 can also have at least one electronic latch that is operable with the one or more processors of the attachment 102.

In one or more embodiments, when the attachment 102 is coupled to the electronic device 101 as shown in FIG. 1, the one or more processors or control circuits of the electronic device 101 and/or attachment 102 actuate the at least two grip sensors 120,121 and the at least two other grip sensors 122,123. In one or more embodiments, when the at least two grip sensors 120,121 and/or the at least two other grip sensors 122,123 detect a grip being applied thereto, the one or more processors of the electronic device 101 and/or attachment 102 can cause at least one electronic latch mechanically retaining the electronic device 101 and attachment 102 together from a latched state to an unlatched state. Advantageously, this allows a user to decouple the electronic device 101 from the attachment 102 simply by gripping each device along the at least two grip sensors 120,121 and/or the at least two other grip sensors 122,123 and moving the attachment 102 away from the electronic device 101.

Where there are audio, vibrational, or other haptic output devices in the electronic device 101 and/or the attachment 102, a sensual feedback can be provided to the user when the grip sensors 120,121 in the electronic device and grip sensors 122, 123 in the attachment 102 detect grip and the latches change to the unlatched state.

It is to be understood that FIG. 1 is provided for illustrative purposes only and for illustrating components of one electronic device 101 and attachment 102 in accordance with embodiments of the disclosure. These figures are not intended to be a complete diagram of the various components included with an electronic device 101 or attachment 102. Therefore, other electronic devices and attachments in accordance with embodiments of the disclosure may include various other components not shown in FIG. 1, or may include a combination of two or more components or a division of a particular component into two or more separate components, and still be within the scope of the present disclosure.

Figure 2:
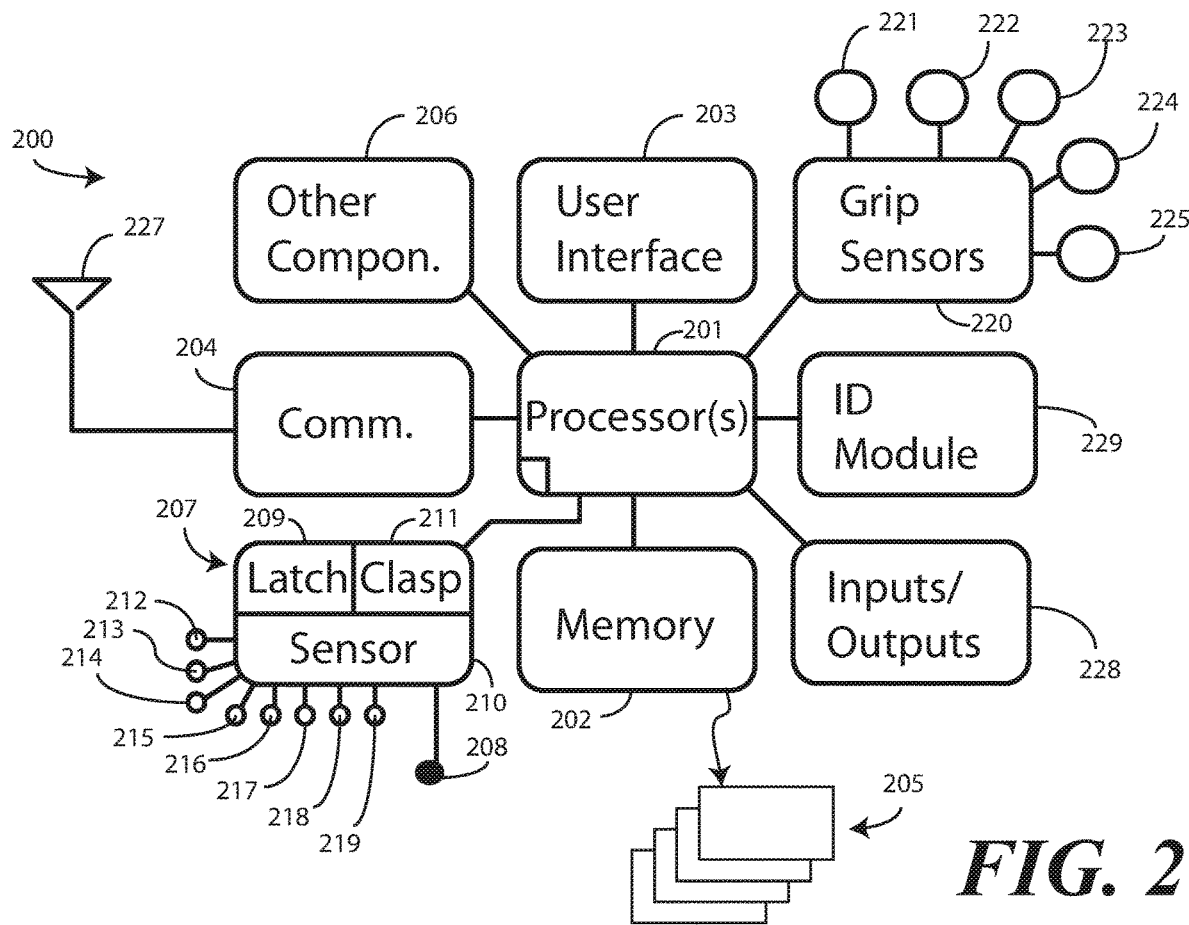
FIG. 2 illustrates a schematic block diagram of one explanatory electronic device in accordance with one or more embodiments of the disclosure.

Turning now to FIG. 2, illustrated therein is a block diagram schematic 200 of the explanatory electronic device (101) described above with reference to FIG. 1. In one embodiment, the electronic device (101) includes one or more processors 201. The one or more processors 201 are operable with the display (104) and other components of the electronic device (101). The one or more processors 201 can include a microprocessor, a group of processing components, one or more Application Specific Integrated Circuits (ASICs), programmable logic, or other type of processing device. The one or more processors 201 can be operable with the various components of the electronic device (101). The one or more processors 201 can be configured to process and execute executable software code to perform the various functions of the electronic device (101).

A storage device, such as memory 202, can optionally store the executable software code used by the one or more processors 201 during operation. The memory 202 may include either or both static and dynamic memory components, may be used for storing both embedded code and user data. The software code can embody program instructions and methods to operate the various functions of the electronic device (101), and also to execute software or firmware applications and modules. The one or more processors 201 can execute this software or firmware, and/or interact with modules, to provide device functionality.

As noted above, in one or more embodiments the electronic device (101) includes a display (104), which may optionally be touch-sensitive. In one embodiment where the display 104 is touch-sensitive, the display 104 can serve as a primary user interface 203 of the electronic device (101). Users can deliver user input to the display (104) of such an embodiment by delivering touch input from a finger, stylus, or other objects disposed proximately with the display. The user interface 203 can also include one or more user input devices (117,118,119), as previously described.

In one embodiment, the display (104) is configured as an organic light emitting diode (OLED) display. However, it should be noted that other types of displays would be obvious to those of ordinary skill in the art having the benefit of this disclosure. In one embodiment, the display (104) includes an electroluminescent layer or light-emitting diode (LED) backlighting layer disposed beneath the display (104) to project light through the display (104). The display (104) can adaptively present text, graphics, images, user actuation targets, data, and controls along the display surface.

In this illustrative embodiment, the electronic device (101) also includes an optional communication circuit 204 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 204 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 204 can include wireless communication circuitry, one of a receiver, a transmitter, or transceiver, and one or more antennas.

The one or more processors 201 can be responsible for performing the primary functions of the electronic device (101). For example, in one embodiment the one or more processors 201 comprise one or more circuits operable with one or more user interface devices, which can include the display (104), to present presentation information to a user. The executable software code used by the one or more processors 201 can be configured as one or more modules 205 that are operable with the one or more processors 201. Such modules 205 can store instructions, control algorithms, and so forth. While these modules 205 are shown as software stored in the memory 202, they can be hardware components or firmware components integrated into the one or more processors 201 as well.

Other components 206 can be included with the electronic device (101). The other components 206 can be operable with the one or more processors 201 and can include input and output components associated with a user interface 203, such as power inputs and outputs, audio inputs and outputs, and/or mechanical inputs and outputs. The other components 206 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. Still other components will be obvious to those of ordinary skill in the art having the benefit of this disclosure.

In one or more embodiments, a latching system 207 comprises one or more electrical connectors 208 that are electrically coupled to the one or more processors 201. The electrical connectors 208 of the latching system 207 that are electrically coupled to the one or more processors 201 facilitate electrical communications between the one or more processors 201 and other components of the electronic device 101 with other electronic components in a companion device or attachment (102) that may be coupled to the electronic device 101.

In one or more embodiments, the latching system 207 also includes at least one electronic latch 209 that is operable with, and responsive to, the one or more processors 201. In one or more embodiments, the one or more processors 201 can electronically control the electronic latch 209 to selectively transition the electronic latch 209 between a latched state and an unlatched state.

In other embodiments, the latching system 207 comprises at least one latch catch 211 instead of the at least one electronic latch 209. As will be described below, in one or more embodiments the at least one latch catch 211 is operable to receive a bolt or clasp from an electronic latch. In still other embodiments, the latching system 207 comprises a combination of at least one electronic latch 209 and at least one latch catch 211. For example, where the latching system 207 is implemented on a minor face (105) of an electronic device (101), the at least one electronic latch 209 can be situated on one side of the minor face (105), while the at least one latch catch 211 is situated on the other side of the minor face (105), and so forth.

Figure 9:
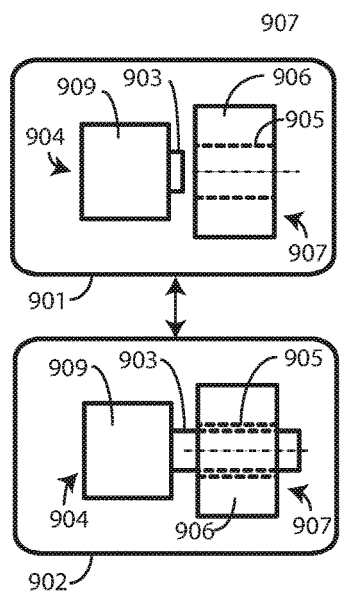
FIG. 9 illustrates one explanatory latch in accordance with one or more embodiments of the disclosure.

The at least one electronic latch 209 and/or at least one latch catch 211 can take any of a variety of forms. Turning now to FIG. 9, illustrated therein is a first example of an electronic latch 909 suitable for use with embodiments of the disclosure. The electronic latch 909 is shown in an unlatched state at step 901, and in a latched state at step 902.

In the illustrative embodiment of FIG. 9, the electronic latch 909 comprises a linear actuator latch that includes a bolt 903 that selectively translates along a linear axis into, and out of, a latch assembly 904. The latch assembly 904 includes a motor or other electronically controllable mechanism allowing the one or more processors (201) of the electronic device (101) to selectively cause the bolt 903 to move out of the latch assembly 904 to the latched position shown at step 902, or alternatively into the latch assembly 904 to the unlatched position shown at step 901.

As shown in FIG. 9, the electronic latch 909 is operable with a latch catch 907. In one or more embodiments, the latch catch 907 is configured for selective engagement with the electronic latch 909.

In this illustrative embodiment, the latch catch 907 comprises a bolt receiver 906. The bolt receiver 906 includes an aperture 905 to receive the bolt 903 from the latch assembly 904. When the bolt receiver 906 is positioned adjacent to the latch assembly 904, transitioning the bolt 903 out of the latch assembly 904 through the aperture causes the bolt receiver 906 to be coupled to the bolt 903, thereby retaining the latch catch 907 to the electronic latch 909. Retracting the bolt 903 back into the latch assembly releases the bolt receiver 906 from the bolt 903, thereby releasing the latch catch 907 from the electronic latch 909.

Figure 10:
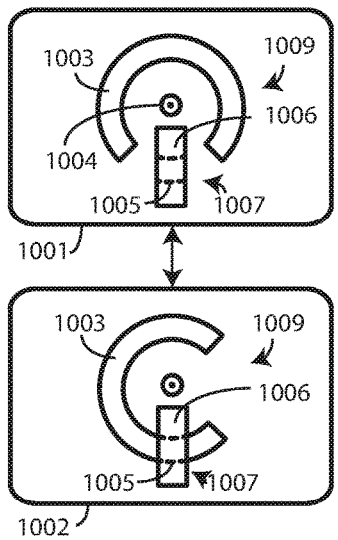
FIG. 10 illustrates another explanatory latch in accordance with one or more embodiments of the disclosure.

Turning now to FIG. 10, illustrated therein is a second example of an electronic latch 1009 suitable for use with embodiments of the disclosure. The electronic latch 1009 is shown in an unlatched state at step 1001, and in a latched state at step 1002.

In the illustrative embodiment of FIG. 10, the electronic latch 1009 comprises an axially rotatable latch that includes a bolt 1003 that selectively rotates about a linear axis between a first position, shown at step 1001, and a second position, shown at step 1002. A motor or other electronically controllable mechanism causes the bolt 1003 to rotate about an axle, thereby allowing the one or more processors (201) of the electronic device (101) to selectively cause the bolt 1003 to move from the second position, i.e., the latched position, as shown at step 1002, or alternatively to the first position, i.e., the unlatched position, as shown at step 1001.

As shown in FIG. 10, the electronic latch 1009 is operable with a latch catch 1007. In one or more embodiments, the latch catch 1007 is configured for selective engagement with the electronic latch 1009.

In this illustrative embodiment, the latch catch 1007 comprises a bolt receiver 1006. The bolt receiver 1006 includes an aperture 1005 to receive the bolt 1003 from the latch assembly 1004. When the bolt receiver 1006 is positioned adjacent to the latch assembly, rotating the bolt 1003 about the axle through the aperture 1005 causes the bolt receiver 1006 to be coupled to the bolt 1003, thereby retaining the latch catch 1007 to the electronic latch 1009. Rotating the bolt 1003 in the opposite direction about the axle releases the bolt receiver 1006 from the bolt 1003, thereby releasing the latch catch 1007 from the electronic latch 1009.

Figure 11:
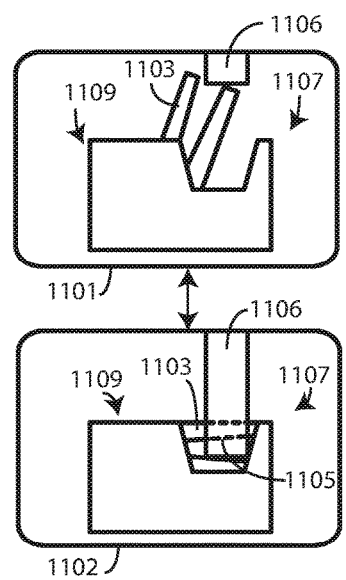
FIG. 11 illustrates still another explanatory latch in accordance with one or more embodiments of the disclosure.

Turning now to FIG. 11, illustrated therein is a third example of an electronic latch 1109 suitable for use with embodiments of the disclosure. The electronic latch 1109 is shown in an unlatched state at step 1101, and in a latched state at step 1102.

In the illustrative embodiment of FIG. 11, the electronic latch 1109 comprises a pivoting clasp that includes a clasp 1103 that selectively pivots between an open position, shown at step 1101, and a closed position, shown at step 1102. A motor or other electronically controllable mechanism causes the clasp 1103 to pivot into, and out of, a latch assembly 1104, thereby allowing the one or more processors (201) of the electronic device (101) to selectively cause the clasp 1103 to move from the closed position, i.e., the latched position, as shown at step 1102, or alternatively to the open position, i.e., the unlatched position, as shown at step 1101.

As shown in FIG. 11, the electronic latch 1109 is operable with a latch catch 1107. In one or more embodiments, the latch catch 1107 is configured for selective engagement with the electronic latch 1109.

In this illustrative embodiment, the latch catch 1107 comprises a clasp catch 1106. The clasp catch 1106 includes an aperture 1105 that selectively engages a leg of the clasp 1103. When the clasp catch 1106 is positioned adjacent to the latch assembly, pivoting the clasp 1103 between the open position and the closed position causes the clasp catch 1106 to be coupled to the clasp, thereby retaining the latch catch 1107 to the electronic latch 1109. Pivoting the clasp 1103 to the open position releases the clasp catch 1106 from the clasp 1103, thereby releasing the latch catch 1107 from the electronic latch 1109.

While three explanatory electronic latches are shown in FIGS. 9-11, it should be noted that numerous other latches can be used with embodiments of the disclosure as well. The electronic latches shown and described in FIGS. 9-11 are illustrative only. For example rather than employing a linear actuator such as that shown in FIG. 9, an electrically controllable magnet that can be transitioned from an attracting state to a neutral state can be used, and so forth. Other examples of electronically controllable coupling devices, latches, and attachment mechanisms will be obvious to those of ordinary skill in the art having the benefit of this disclosure.

Turning now back to FIG. 2, in one or more embodiments the latching system 207 also includes an attachment sensor 210. In one or more embodiments, the attachment sensor 210 is operable with the one or more processors 201.

Examples of attachment sensors suitable for use with embodiments of the disclosure include infrared sensors 212, Hall effect sensors 213, light sensors 214, capacitive sensors 215, inductive sensors 216, electronic communication interface components 217, or connectors 218 such as a Universal Serial Bus connector or other type of connector. Other examples of attachment sensors will be obvious to those of ordinary skill in the art having the benefit of this disclosure. For example, an image capture device can be used as an attachment sensor and can capture images from the device housing (103) such that image analysis can be performed on the images to detect whether an attachment (102) is attached to the electronic device (101). In other embodiments, sonar or electromagnetic detectors that emit sound or light from a transmitter, which is reflected from the attachment (102) to a receiver can be used to determine whether an attachment (102) is attached to the electronic device (101), and so forth.

In one or more embodiments, the attachment sensor 210 is operable to detect whether an attachment (102) or other companion device is attached to the electronic device (101). In one or more embodiments the attachment sensor 210 comprises a transmitter and a receiver. Examples of such attachment sensors 210 include, but are not limited to, capacitive, magnetic, inductive, optical/photoelectric, imager, laser, acoustic/sonic, radar-based, Doppler-based, thermal, and radiation-based proximity sensors.

In one or more embodiments, the attachment sensor 210 comprises an infrared sensor 212 that uses a signal emitter that transmits a beam of infrared light that reflects from a nearby object, such as an attachment (102), and is received by a corresponding signal receiver. Such an attachment sensor 210 can, in addition to detecting whether an attachment (102) or other companion device is attached to the electronic device (101), compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Illustrating by example, where the attachment sensor 210 comprises an infrared sensor, the attachment sensor 210 may include an infrared transmitter and an infrared receiver. The infrared transmitter may emit infrared light that is reflected from the attachment housing (110) of an attachment (102) or other companion device. When the infrared receiver receives this reflected infrared light, the one or more processors 201 may conclude that an attachment (102) or other companion device is physically coupled to, or at least adjacent with, the device housing (103) of the electronic device (101), and so forth.

In one or more embodiments, one or more grip sensors 220 that are operable with the one or more processors 201. In one or more embodiments, the electronic device (101) includes at least two grip sensors 220 that are situated on the device housing (103) and are separated from each other by a predefined distance. The grip sensors 220 gather information regarding how some feature or thing positioned outside of the electronic device (101), such as a user of the electronic device (101), is interacting with the electronic device (101). Illustrating by example, the one or more grip sensors 220 may interface with the device housing (103) and operatively determine a user's hand position along the device housing (103).

As with the attachment sensor 210, the one or more grip sensors 220 can take a variety of forms. Illustrating by example, in one embodiment a touch sensitive display 221 serves as a grip sensor 220 by detecting when a hand passes across a major dimension of the touch sensitive display 221. In other embodiments, one or more grip sensors 220 can include a capacitive touch sensor 222, an infrared touch sensor 223, resistive touch sensors 224, inductive touch sensors 225, or another touch-sensitive technology. The one or more grip sensors 220 can comprise force sensors 226 and/or pressure sensors 227 as well.

These various sensors can be used alone or in combination. For example, where an electronic device (101) includes at least two grip sensors 220, a first grip sensor can be a capacitive touch sensor while another touch sensor is a touch sensitive display. Alternatively, the two or more grip sensors 220 can all be of the same type. Additionally, the list of grip sensors 220 set forth here is illustrative. Other examples of grip sensors will be obvious to those of ordinary skill in the art having the benefit of this disclosure. Illustrating by example, in still another embodiment an antenna 227 may serve as a grip sensor due to the fact that gain characteristics of the antenna 227 may be affected and therefore change in response to a user's hand position.

In one or more embodiments, when at least two grip sensors 220 detect a grip of a user's hand being applied to the at least two grip sensors 220, the one or more processors 201 transition the at least one electronic latch 209 from a latched state, e.g., step (902) of FIG. 9, to an unlatched state, e.g., step (901) of FIG. 9. In one or more embodiments, the one or more processors 201 transition the at least one electronic latch 209 form the latched state to the unlatched state only when the attachment sensor 210 concurrently detects an attachment (102) being attached to the electronic device (101) when the at least two grip sensors 220 detect an initial application of the grip of a user's hand to the at least grip sensors 220. As will be described in more detail below, in some operating conditions, such as when the electronic device (101) is physically decoupled from the attachment (102), the at least two grip sensors 220 can be deactuated or placed into a low-power or sleep mode to conserve energy stored in an energy storage device such as a lithium-based or nickel-based battery. As such, the one or more processors 201 can selectively deactuate the at least two grip sensors 220 when the attachment sensor 210 detects the attachment (102) being detached from the electronic device (101) in one or more embodiments.

In one or more embodiments, when the attachment sensor 210 detects the attachment (102) later being attached to the electronic device (101), the one or more processors 201 can transition the at least one electronic latch 209 from the unlatched state to the latched state to mechanically retain the attachment (102) in an attached configuration to the electronic device (101). Thereafter, or concurrently, the one or more processors 201 can again actuate the at least two grip sensors 220 when the attachment sensor detects the attachment (102) being attached to the electronic device (101). This process will be illustrated in more detail below with reference FIGS. 5-6.

In one or more embodiments, the electronic device (101) also includes one or more inputs and outputs 228 that are operable with the one or more processors 201. The one or more inputs and outputs 228 can be configured to receive input from, or deliver output to, an environment about the electronic device (101). Illustrating by example, the inputs and outputs 228 can include devices for determining information such as motion, bearing, location, acceleration, orientation, proximity to people and other objects, incident light amounts, and so forth. The one or more inputs and outputs 228 can include various combinations of microphones, location detectors, motion sensors, physical parameter sensors, temperature sensors, barometers, proximity sensor components, proximity detector components, wellness sensors, touch sensors, cameras, audio capture devices, and so forth.

The one or more inputs and outputs 228 can also include audio sensors and video sensors (such as a camera). The one or more inputs and outputs 228 can also include motion detectors, such as one or more accelerometers or gyroscopes. The motion detectors can detect movement, and direction of movement, of the electronic device (101) by a user. The one or more inputs and outputs 228 can also be used to detect gestures. For example, the other one or more inputs and outputs 228 can include one or more proximity sensors that detect the gesture of a user waving a hand above the display (104). It should be clear to those of ordinary skill in the art having the benefit of this disclosure that additional sensors can be included as well. Moreover, other types of inputs and outputs 228 will be obvious to those of ordinary skill in the art having the benefit of this disclosure.

As noted above, in one or more embodiments the electronic device (101) is operational in a first configuration as a stand-alone electronic device. However, in other embodiments, the electronic device (101) is selectively attachable and detachable from an attachment (102). Where this is the case, an optional identification module 229 can be configured to determine the type of attachment (102) that is attached to the electronic device (101). Additionally, in one or more embodiments the optional identification module 229 can be used in conjunction with, or instead of, the attachment sensor, as the identification module 229 can also be configured to determine whether an attachment (102) is even coupled to the electronic device (101).

The identification module 229 can be operable with an electrical connector to determine what type of attachment (102) is coupled to the electronic device (101). The identification module 229 can identify the attachment (102) by exchanging electrical signals with the attachment (102). Other examples of identification techniques will be obvious to those of ordinary skill in the art having the benefit of this disclosure.

Figure 3:
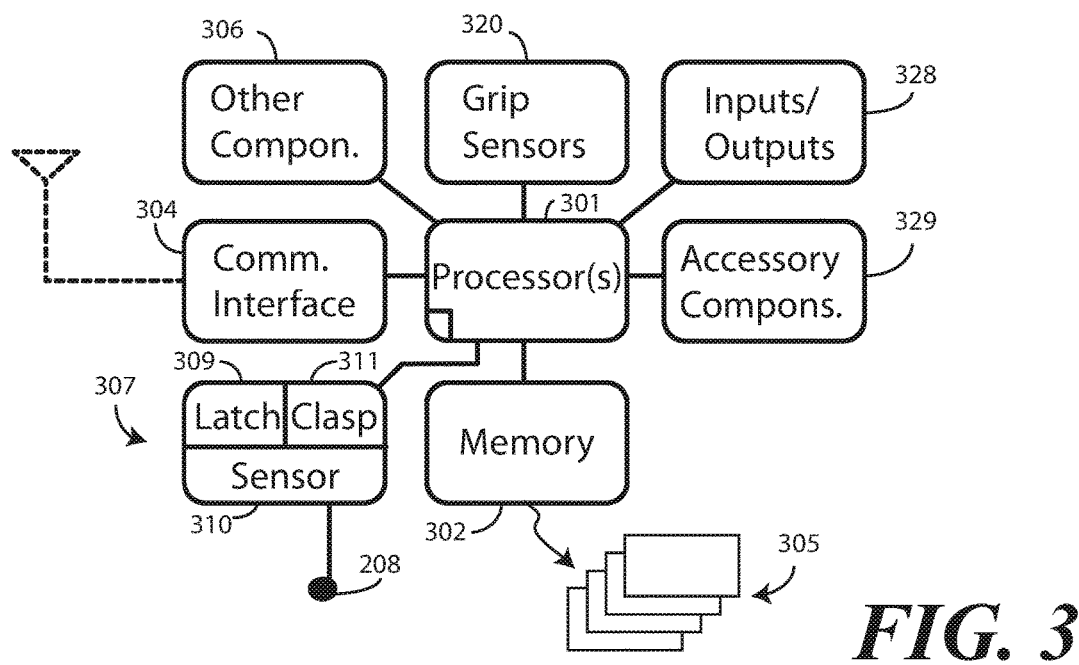
FIG. 3 illustrates a schematic block diagram of one explanatory electronic device attachment in accordance with one or more embodiments of the disclosure.

Turning now to FIG. 3, illustrated therein are explanatory components that may be included in attachments configured in accordance with one or more embodiments of the disclosure. The components can be included in various combinations, with some attachments including more components, while other attachments include fewer components, and so forth. Said differently, FIG. 3 shows only one explanatory component group forming part of an environment within which aspects of the present disclosure may be implemented. It will be appreciated that additional or alternative components may be used in a given implementation depending upon user preference, component availability, price point, and other considerations. All or some of the components communicate with one another by way of one or more shared or dedicated internal communication links, such as an internal bus.

In one or more embodiments, an attachment (102) can include, in addition to, or in place of, the second display (111) described above, one or more processors 301, a memory 302, a communication interface 304, a latching system 307, inputs and outputs 328, one or more grip sensors 320, one or more other components 306, and one or more accessory components 329.

The one or more processors 301 may be any of a microprocessor, microcomputer, application-specific integrated circuit, or the like, and is operable with the latching system 307, the one or more grip sensors 320, the inputs and outputs 328, one or more other components 306, and one or more accessory components 3298 of the attachment (102). The memory 302 may reside on the same integrated circuit as the one or more processors 301, or alternatively may be a separate component. The memory 302 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 302 may include a read only memory (i.e., a hard drive, flash memory or any other desired type of memory device).

Information that is stored by the memory 302 can include program code associated with operating the latching system 307, the one or more grip sensors 320, the inputs and outputs 328, the one or more other components 306, and the one or more accessory components 329, receiving information to control the latching system 307, the one or more grip sensors 320, the inputs and outputs 328, one or more other components 306, and one or more accessory components 329, or to other informational data, e.g., program parameters, process data, etc. The operation of the one or more processors 301 can be in accordance with executable instructions stored in a non-transitory computer readable medium (e.g., memory 302) to control basic functions of the attachment (102) and its the latching system 307, the one or more grip sensors 320, inputs and outputs 328, one or more other components 306, and one or more accessory components 329.

In one or more embodiments, the one or more processors 301 are programmed to interact with the other components of the attachment (102) to perform certain functions. The one or more processors 301 may include or implement various modules and execute programs for initiating different activities. The communication interface 304 can be used for communication with an electronic device (101) to which an attachment (102) including this component group is attached.

For example, the communication interface 304 can be responsible for sending and receiving electrical signals between the electronic device (101) and the attachment (102). These electrical signals can include signals from the inputs and outputs 328, one or more other components 306, and one or more accessory components 329, and so forth. Other electrical signals handled by the communication interface 304 will be obvious to those of ordinary skill in the art having the benefit of this disclosure.

In one or more embodiments, the attachment (102) may include its own energy source, with which the one or more processors 301, and/or other components can be powered. The inclusion of a dedicated energy source prevents draining the energy source of the electronic device (101) to energize the various components of the attachment (102), thereby extending runtime of the electronic device (101) when the attachment (102) is coupled thereto. The energy source can include a battery or fuel cell for providing power to various components of the attachment (102) and their corresponding components.

The accessory components 329 can take various forms. In the illustrative embodiment of FIG. 1 above, the accessory component 329 was a second display (111). However, embodiments of the disclosure are not so limited. Turning briefly now to FIG. 4, illustrated therein are various other accessory components and configurations the attachment 102 may take in accordance with embodiments of the disclosure.

In one or more embodiments, the accessory components (329) comprise wireless communication circuitry 401. This allows the attachment 102 to provide increased or enhanced communication capabilities for the electronic device (101) to which it is attached. For instance, if the electronic device (101) is equipped with a communication circuit (204) configured for electrical communications in accordance with a first standard, and a new, faster, and better standard is adopted, attaching an attachment 102 with wireless communication circuitry configured to communicate at the new standard provides increased communication capabilities for the electronic device (101).

In one or more embodiments, the accessory components (329) comprise a loudspeaker 402. In one or more embodiments, the loudspeaker 402 can be an enhanced loudspeaker compared to that of the electronic device (101) to which the attachment (102) is attached. Illustrating by example, if the electronic device (101) includes a mono aural loudspeaker, the loudspeaker 402 of the attachment may be a stereo speaker, and so forth.

In one or more embodiments, the accessory components (329) comprise a projector 403. The projector 403 can allow the electronic device (101) to project images on wall or other projection surface. Advantageously, coupling an attachment 102 having a projector 403 as the accessory component (608) allows a user to project and stream movies, photos, and shows in one or more embodiments.

In one or more embodiments, the accessory components (329) comprise a printer 404. The printer 404 can be used to print photographs, documents, and other items captured by the electronic device (101) to which the attachment 102 is attached, or alternatively that are captured by the attachment 102 itself.

In one or more embodiments, the accessory components (329) comprise a virtual assistant 405. The virtual assistant 405 may include a voice activated set of processors and communication circuits that retrieve answers to questions received by one or more microphones of the attachment 102. The virtual assistant 405 may be able to stream music or other information in response to voice requests from a user. Additionally, the virtual assistant 405 may be able to manage calendars, to-do lists, and other applications as well.

In one or more embodiments, the accessory components (329) comprise an auxiliary camera 406. While many electronic devices to which the attachment 102 is attached will include a primary camera, the auxiliary camera 406 of the attachment 102 may include enhanced features. For example, while the primary camera of the electronic device (101) may have a limited field of view, the auxiliary camera 406 may be a 360-degree camera, and so forth.

In one or more embodiments, the accessory components (329) comprise a gaming device 407. The gaming device may include physical buttons and/or other controls to simulate a traditional video game or arcade game controller to provide a user with a more realistic gaming experience compared to using a touch-screen or other user input device to control gaming operations. The gaming device 407 may include joysticks or other large mechanical controls that are not desirable to have on an electronic device (101) to which the attachment 102 is attached. Advantageously, when a user desires to engage in serious gaming, the user can attach the attachment 102 with the gaming device 407 to the electronic device (101), removing it thereafter when the gaming is done.

In one or more embodiments, the accessory components (329) comprise a charger or power supply 408, which can include an energy source or storage device as well. An attachment 102 so equipped can serve as a power pack for the electronic device (101) to which it is attached, thereby enabling the electronic device (101) to have an increased run time compared with when the attachment 102 is dethatched from the electronic device (101).

In one or more embodiments, the accessory components (329) comprise a shell or protector device 409. The shell or protector device 409 can be configured as a folio that protects the electronic device (101) to which the attachment 102 is coupled from every day scratches and bumps. In one or more embodiments, the shell or protector device 409 includes pockets to hold supplemental objects, such as money or credit cards. Where configured as a folio, the shell or protector device 409 can include snaps or magnets to hold the folio closed when not in use. The shell or protector device 409 can come in different colors and can be manufactured from different materials in one or more embodiments.

In one or more embodiments, the accessory components (329) comprise an additional display 111, as previously described. The incorporation of an additional display 111 into the attachment 102 allows the usable display space of the electronic device (101) to which the attachment 102 is attached to be extended to form a larger overall effective display.

Figure 4:
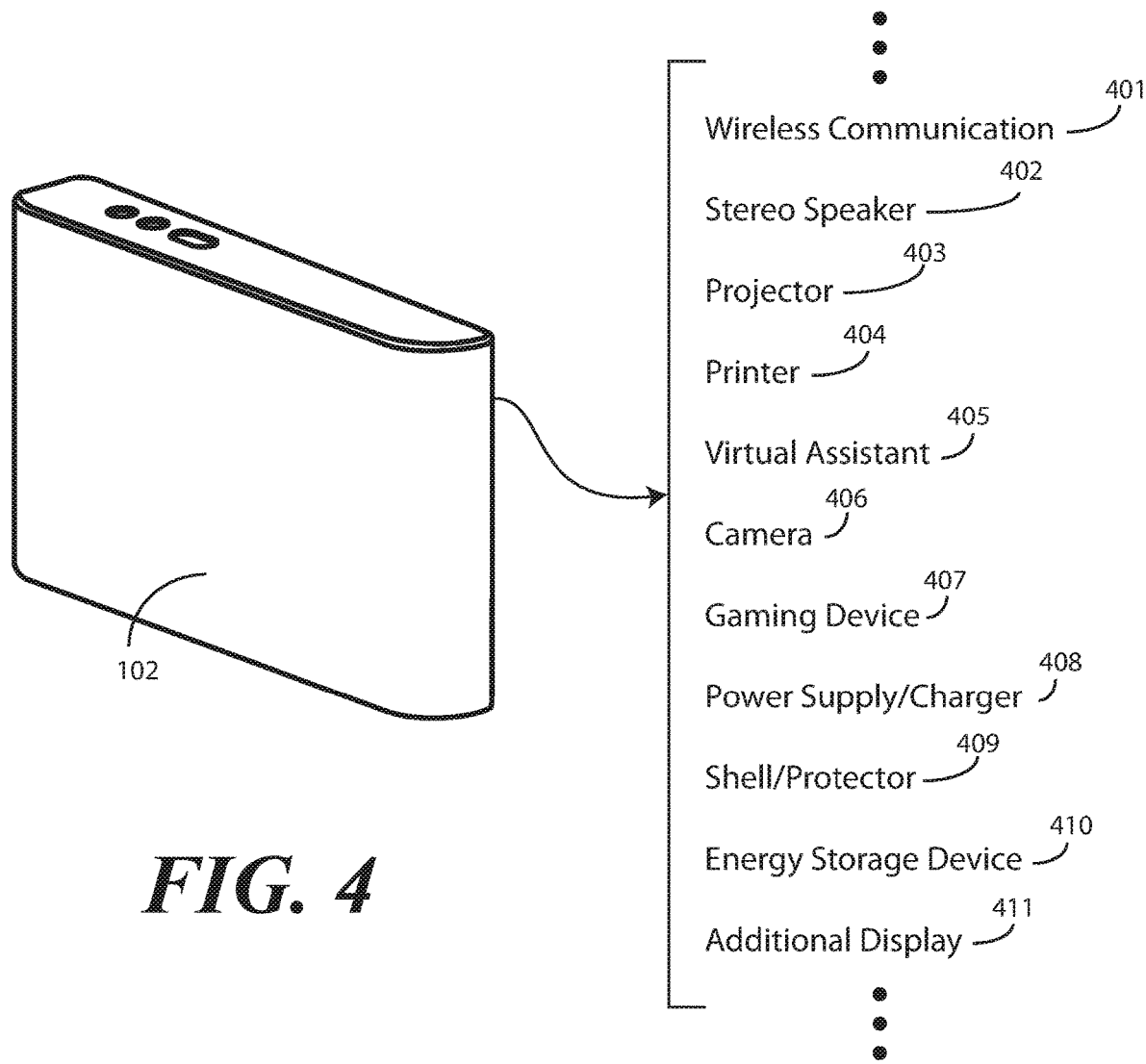
FIG. 4 illustrates examples of various attachments in accordance with one or more embodiments of the disclosure.

It should be noted that the list of accessory components (329) set forth in FIG. 4 is illustrative only. Numerous others will be obvious to those of ordinary skill in the art having the benefit of this disclosure.

Moreover, it should be noted that the accessory components (329) of FIG. 4 can be incorporated into the attachment 102 alone or in combination. Illustrating by example, in one or more embodiments the attachment 102 includes an additional display 111 on the front major face 112 and a camera 406 on the rear major face. Since the attachment 102 can be reversibly coupled to the electronic device (101) in one or more embodiments, the system comprising the electronic device (101) and attachment 102 can be configured in different ways. One can couple the attachment 102 to the electronic device (101) in the first configuration such that the display (104) of the electronic device (101) and the additional display 111 of the attachment 102 are arranged side-by-side. The one or more processors (201) of the electronic device (101) can then use this "second" display of the attachment 102 in unison with the display (104) of the electronic device (101) to create a larger overall display presentation area.

By contrast, when the attachment 102 is coupled to the electronic device in the second configuration, the camera 406 of the attachment 102 is situated adjacent to the display (104) of the electronic device (101). This allows the person to take "selfies," engage in video conferences, and perform other operations with the camera 406 that would not be possible if the camera 406 were permanently situated on the rear face of the combined device. Advantageously, simply by "flipping" the accessory around, the person has the option of having an enlarged display at some times and a front-facing camera at others.

Turning now back to FIG. 3, in one or more embodiments the latching system 307 of the attachment (102) comprises one or more electrical connectors 308 that are electrically coupled to the one or more processors 301. The electrical connectors 308 of the latching system 307 that are electrically coupled to the one or more processors 301 facilitate electrical communications between the one or more processors 301 and other components of the attachment (102) with other electronic components in an electronic device (101) that may be coupled to the attachment (102).

In one or more embodiments, the latching system 307 of the attachment (102) also includes at least one electronic latch 309 that is operable with, and responsive to, the one or more processors 301. In one or more embodiments, the one or more processors 301 can electronically control the electronic latch 309 to selectively transition the electronic latch 309 between a latched state and an unlatched state.

In other embodiments, the latching system 307 comprises at least one latch catch 311 instead of the at least one electronic latch 309. In one or more embodiments the at least one latch catch 311 is operable to receive a bolt or clasp from an electronic latch. In still other embodiments, the latching system 307 comprises a combination of at least one electronic latch 309 and at least one latch catch 311, as previously described. The at least one electronic latch 309 and/or at least one latch catch 311 can take any of a variety of forms, including those shown in FIGS. 9-11. Other examples will be obvious to those of ordinary skill in the art having the benefit of this disclosure.

In one or more embodiments the latching system 307 also includes an electronic device sensor 310. In one or more embodiments, the electronic device sensor 310 is operable with the one or more processors 301. In one or more embodiments, the electronic device sensor 310 is operable to detect whether the electronic device (101) is coupled to the attachment (102).

In one or more embodiments, one or more grip sensors 320 that are operable with the one or more processors 301. In one or more embodiments, the attachment (102) includes at least two grip sensors 320 that are situated on the attachment housing (110) and are separated from each other by a predefined distance. As with the electronic device sensor 310, the one or more grip sensors 320 can take a variety of forms, including those described above with reference to FIG. 2. These various sensors can be used alone or in combination.

In one or more embodiments, when at least two grip sensors 320 detect a grip of a user's hand being applied to the at least two grip sensors 320, the one or more processors 301 transition the at least one electronic latch 309 from a latched state, e.g., step (902) of FIG. 9, to an unlatched state, e.g., step (901) of FIG. 9. In one or more embodiments, the one or more processors 301 transition the at least one electronic latch 309 form the latched state to the unlatched state only when the electronic device sensor 310 concurrently detects an electronic device (101) being attached to the attachment (102) when the at least two grip sensors 320 detect an initial application of the grip of a user's hand to the at least grip sensors 320.

In some operating conditions, such as when the electronic device (101) is physically decoupled from the attachment (102), the at least two grip sensors 320 can be deactuated or placed into a low-power or sleep mode to conserve energy stored in an energy storage device such as a lithium-based or nickel-based battery. As such, the one or more processors 301 can selectively deactuate the at least two grip sensors 320 when the electronic device sensor 310 detects the attachment (102) being detached from the electronic device (101) in one or more embodiments.

In one or more embodiments, when the electronic device sensor 310 detects the attachment (102) later being attached to the electronic device (101), the one or more processors 301 can transition the at least one electronic latch 309 from the unlatched state to the latched state to mechanically retain the attachment (102) in an attached configuration to the electronic device (101). Thereafter, or concurrently, the one or more processors 301 can again actuate the at least two grip sensors 320 when the attachment sensor detects the attachment (102) being attached to the electronic device (101).

Figure 5:
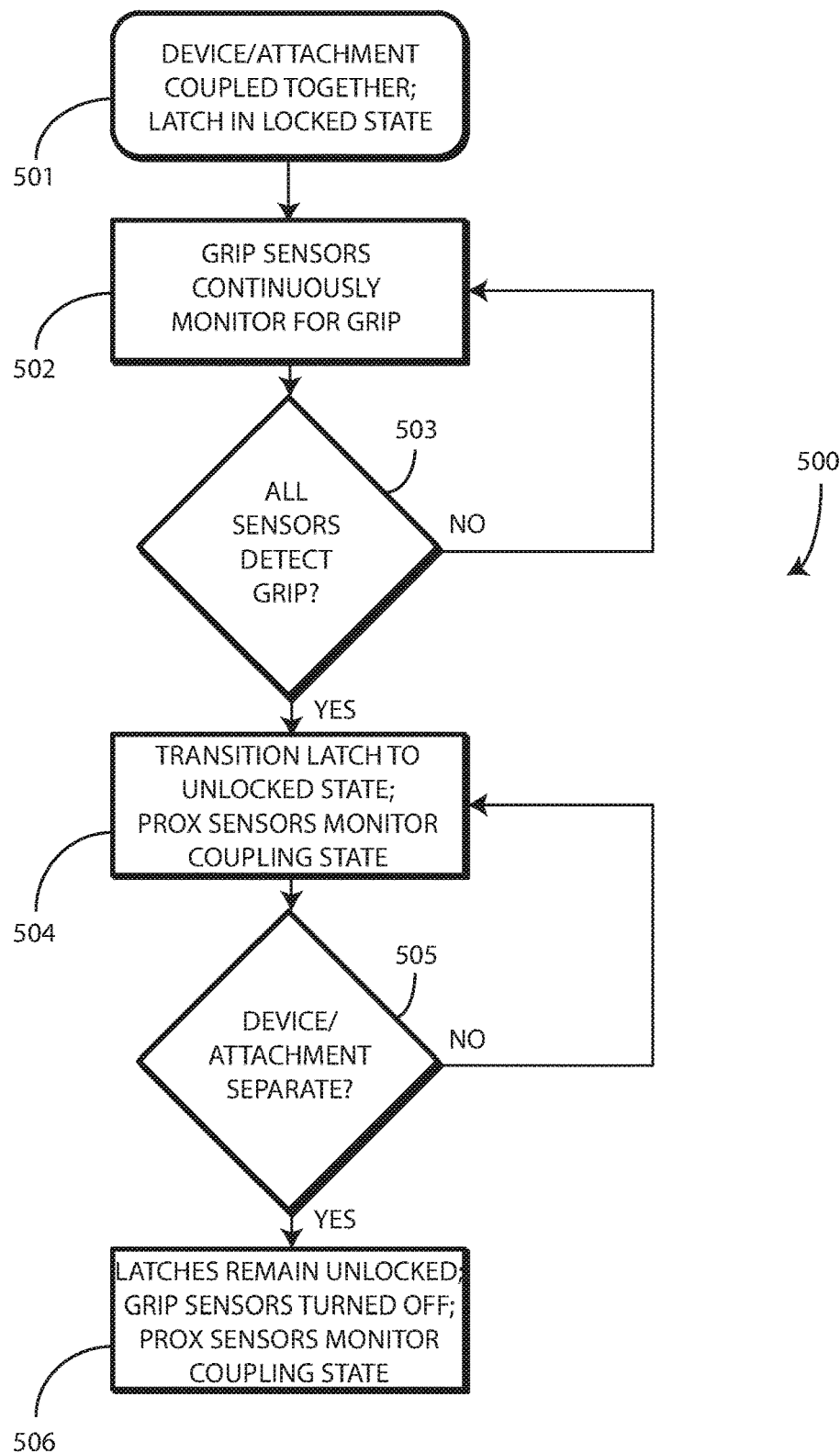
FIG. 5 illustrates one explanatory method in accordance with one or more embodiments of the disclosure.

Now that the various hardware components and configurations have been described, attention will be turned to methods of using these devices, components, and systems to selectively latch, and unlatch, electronic devices together. Turning now to FIG. 5, illustrated therein is one explanatory method 500 suitable for use with an electronic device (101) or attachment (102) configured in accordance with embodiments of the disclosure.

Beginning at state 501, an electronic device and an attachment are coupled together by one or more electronic latches. Illustrating by example, where the electronic device includes an attachment sensor operable with one or more processors and at least one electronic latch, the one or more processors can transition the at least one electronic latch from the unlatched state to the latched state when the attachment sensor detects the attachment being attached to the electronic device to arrive at state 501. Similarly, where the attachment includes an electronic device sensor operable with one or more other processors of the attachment and at least one other electronic latch, the one or more other processors can transition the at least one other electronic latch from the unlatched state to the latched state when the electronic device sensor detects the electronic device being attached to the attachment to arrive at state 501. Of course, combinations of these two techniques can be used as well.

At step 502, the one or more processors of the electronic device and/or the one or more other processors of the attachment actuate the at least two grip sensors of the electronic device and/or the at least two other grip sensors of the attachment, respectively. In one or more embodiments, when the electronic device is physically detached or uncoupled from the attachment, the one or more processors of the electronic device and/or the one or more other processors of the attachment deactuate the at least two grip sensors of the electronic device and/or the at least two other grip sensors of the attachment, respectively, to save power. However, upon the electronic device and attachment being coupled together at state 501, in one or more embodiments these grip sensors are actuated.

At decision 503, the one or more processors of the electronic device and/or the one or more other processors of the attachment determine whether a grip of a user's hand is detected by the at least two grip sensors of the electronic device and/or the at least two other grip sensors of the attachment. In one or more embodiments, decision 503 determines whether all the grip sensors of both the electronic device and the attachment detect a grip of a user's hand. Illustrating by example, if the electronic device includes two grip sensors separated by a predefined distance, with the attachment including two other grip sensors separated by a predefined distance, in one or more embodiments decision 503 determines whether all four grip sensors detect the grip of a user's hand. Where they do not, the method 500 returns to step 502 in which the grip sensors monitor for the application of a grip.

Where they do, or alternatively where a subset of the grip sensors carried by the electronic device and/or attachment detect the grip of a user's hand, the method 500 moves to step 504. In one or more embodiments, step 504 comprises one or more processors of the electronic device transitioning the at least one electronic latch retaining the attachment to the electronic device from a latched state to an unlatched state. Where the attachment also carries at least one other electronic latch, step 504 comprises the one or more other processors of the attachment transitioning the at least one other electronic latch from the latched state to the unlatched state. This allows the attachment and electronic device to be physically separated from each other.

Decision 505 then determines whether the attachment and electronic device actually do become physically separated. For example, in one embodiment an attachment sensor of the electronic device determines whether the attachment is removed from an attached state where the attachment housing abuts the device housing to a detached state where the attachment housing is physically separated from the device housing by a predefined distance. Similarly, decision 505 can include an electronic device sensor determining whether the electronic device is removed from an attached state where the device housing abuts the attachment housing to a detached state where the device housing is physically separated from the attachment housing by a predefined distance.

Step 506 then optionally comprises the one or more processors of the electronic device and/or the one or more other processors of the attachment deactuating the at least two grip sensors of the electronic device and/or the at least two other grip sensors of the attachment, respectively, to save power. Regardless of whether the grip sensors are deactuated at step 506, in one or more embodiments the attachment sensor and/or electronic device sensor continue to monitor for a reattachment of the electronic device to the attachment or another attachment. The attachment sensor and/or electronic device sensor can monitor for situations where an attachment housing is attached to the electronic device by detecting attachment housing of the attachment abutting the device housing of the electronic device.

Figure 6:
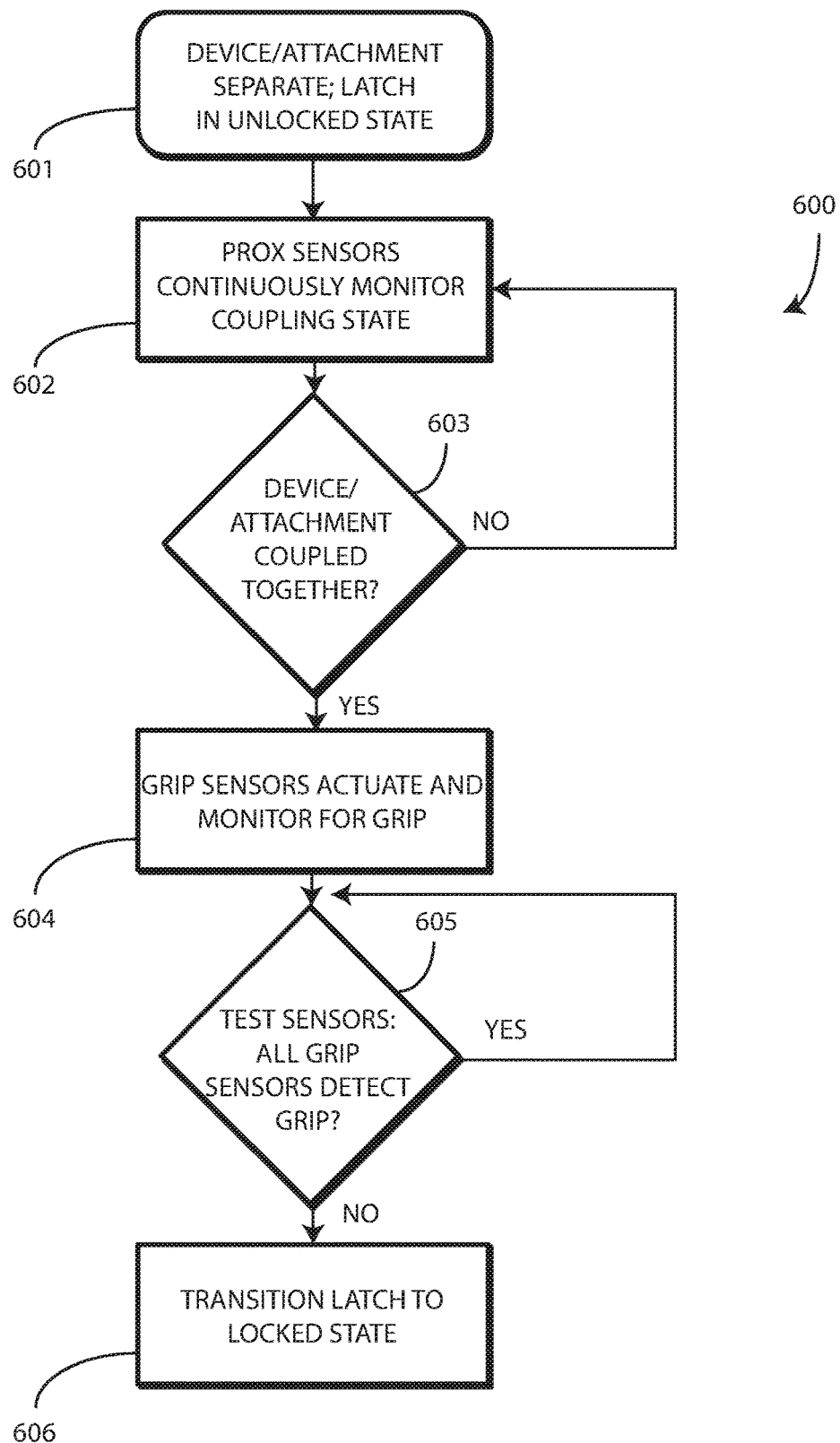
FIG. 6 illustrates another explanatory method in accordance with one or more embodiments of the disclosure.

Turning now to FIG. 6, illustrated therein is another method 600 suitable for use with an electronic device (101) or attachment (102) configured in accordance with embodiments of the disclosure. At state 601, the attachment and electronic device are physically separated from each other by at least a predefined distance. Accordingly, the attachment is not mechanically coupled to the electronic device. In one or more embodiments, state 601 comprises the at least one latch of the electronic device and the at least one other electronic latch of the attachment, where included, being in the latched state. In one or more embodiments, state 601 includes the grip sensors carried by the device housing and the other grip sensors carried by the attachment housing being in a deactuated, low-power, or sleep mode.

Step 602 is like step (506) of FIG. 5. To with, in one or more embodiments the attachment sensor and/or electronic device sensor continue to monitor for a reattachment of the electronic device to the attachment or another attachment. The attachment sensor and/or electronic device sensor can monitor for situations where an attachment housing is attached to the electronic device by detecting attachment housing of the attachment abutting the device housing of the electronic device.

Decision 603 then determines whether this occurs. Where no attachment is attached to an electronic device, or alternatively where no electronic device is attached to an attachment, the method 600 returns to step 602, where the attachment sensor and/or electronic device sensor continue to monitor for a reattachment of the electronic device to the attachment or another attachment.

Where an attachment is detected at decision 603, the method 600 moves to step 604. In one or more embodiments, step 604 comprises one or more processors of the electronic device transitioning the at least one electronic latch from an unlatched state to a latched state, thereby retaining the attachment to the electronic device. Where the attachment also carries at least one other electronic latch, step 604 comprises the one or more other processors of the attachment transitioning the at least one other electronic latch from the unlatched state to the latched state, thereby also retaining the attachment and electronic device physically and mechanically together as a system.

In one or more embodiments, step 604 also includes the one or more processors of the electronic device and/or the one or more other processors of the attachment actuating the at least two grip sensors of the electronic device and/or the at least two other grip sensors of the attachment, respectively. In one or more embodiments, upon the electronic device and attachment being coupled together, in one or more embodiments these grip sensors are actuated or returned to a normal mode of operation from the low-power or sleep mode they may have been in when the electronic device and attachment were physically separated.

Embodiments of the disclosure contemplate that, as step 604 can cause the method 600 to return to step (502) in one or more embodiments, the at least one electronic latch and the at least one other electronic latch (where included) could potentially toggle between a latched and unlatched state depending upon how long it takes the user to release the at least two grip sensors and/or the at least two other grip sensors. In one or more embodiments, to prevent this toggling, step 604 comprises only the one or more processors of the electronic device and/or the one or more other processors of the attachment actuating the at least two grip sensors of the electronic device and/or the at least two other grip sensors of the attachment, respectively. In one or more embodiments, upon the electronic device and attachment being coupled together, in one or more embodiments these grip sensors are actuated or returned to a normal mode of operation from the low-power or sleep mode they may have been in when the electronic device and attachment were physically separated.

Thereafter, decision 605 comprises testing the grip sensors to see if the user has released their grip from at least one grip sensor. When any one or more grip sensors of the at least two grip sensors and/or the at least two other grip sensors detect the release of a grip, i.e., when one or all of the at least two grip sensors and/or the at least two other grip sensors fail to detect a grip, the method moves to step 606 where one or more processors of the electronic device transition the at least one electronic latch from an unlatched state to a latched state, thereby retaining the attachment to the electronic device. Where the attachment also carries at least one other electronic latch, step 606 comprises the one or more other processors of the attachment transitioning the at least one other electronic latch from the unlatched state to the latched state, thereby also retaining the attachment and electronic device physically and mechanically together as a system. Otherwise, the one or more processors keep testing the at least two grip sensors and/or the at least two other grip sensors at decision 605. This prevents any latch toggling from occurring.

Figure 7:
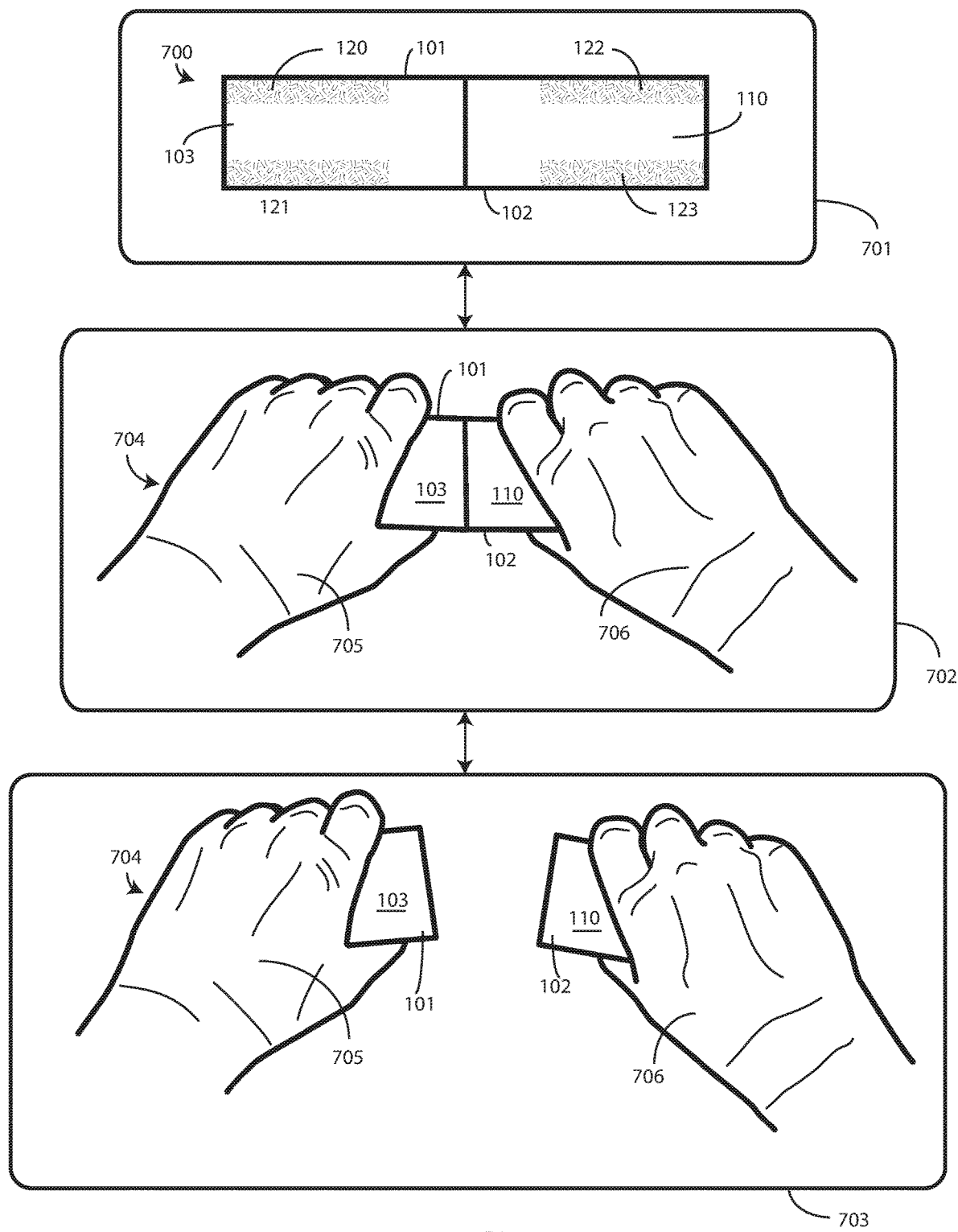
FIG. 7 illustrates still another explanatory method in accordance with one or more embodiments of the disclosure.

The methods of FIGS. 5-6 are shown illustratively in operation in FIG. 7. Turning now to FIG. 7, beginning at step 701, a system 700 comprises an electronic device 101 and an attachment. As previously described, the electronic device 101 includes at least two grip sensors 120,121 disposed along a device housing 103 of the electronic device. One or more processors (201) are operable with the at least two grip sensors 120,121. Similarly, a first electronic latch (209) is operable with the one or more processors (201) as well.

The attachment 102 comprises at least two other grip sensors 122,123 disposed along the attachment housing 110. In one or more embodiments, the attachment 102 also comprises one or more other processors (301) that are operable with the at least two other grip sensors 122,123. The attachment 102 can optionally also include at least one other electronic latch 309 that is operable with the one or more other processors (301) as well.

As shown at step 701, the electronic device 101 and the attachment 102 are physically and mechanically coupled together. In this illustrative embodiment, the attachment 102 is attached to the electronic device 101 such that the attachment housing 110 of the attachment 102 abuts the device housing 103 of the electronic device 101.

At step 702, a user 704 applies a grip to each of the electronic device 101 and the attachment 102. In this illustrative example, the user 704 places a hand 705 along the device housing 103 such that it contacts the at least two grip sensors 120,121 carried by the device housing. Similarly, the user 704 places another hand 706 along the attachment housing 110 such that it contacts the at least two other grip sensors 122,123 carried by the attachment housing 110.

In one or more embodiments, when this occurs the one or more processors (201) of the electronic device 101 transition the at least one electronic latch (209) from the latched state to the unlatched state. In one or more embodiments, the one or more processors (301) of the attachment 102 transition the at least other one electronic latch (309) from the latched state to the unlatched state. This allows the user 704 to physically decouple the electronic device 101 from the attachment 102, simply by grasping each with their hands 705,706, as shown at step 703.

In one or more embodiments, where the electronic device 101 includes an attachment sensor (210) and/or the attachment 102 includes an electronic device sensor (310), the unlatching operation occurring at step 702 occurs only when the electronic device 101 and attachment 102 are initially in the latched state shown at step 701. Said differently, in one or more embodiments where the electronic device 101 includes an attachment sensor (210) detecting whether the attachment 102 is attached to the electronic device 101, step 702 comprises the one or more processors (201) transitioning the at least one electronic latch (209) from the latched state to the unlatched state only when the attachment sensor (210) concurrently detects an attachment being attached to the electronic device 101 when the at least two grip sensors 120,121 detect an initial application of the grip to the at least two grip sensors 120,121.

The attachment 102 can function in a similar fashion. In one or more embodiments, the one or more other processors (301) cause the at least one other electronic latch (309) to transition from the latched state to the unlatched state only when the electronic device sensor (310) concurrently detects the attachment 102 being attached to the electronic device 101 when the at least two other grip sensors 122,123 detect an initial application of the grip to the at least two other grip sensors 122,123.

In one or more embodiments, once step 703 occurs, the one or more processors (201) of the electronic device 101 then deactivate the at least two grip sensors 120,121 carried by the device housing 103 to save power. In one or more embodiments, this occurs when the attachment sensor (210) detects the physical separation of the electronic device 101 and attachment 102 at step 703. Similarly, the one or more other processors (301) of the attachment 102 can deactivate the at least two other grip sensors 122,123 carried by the attachment housing 110 to also save power. In one or more embodiments, this occurs when the electronic device sensor (310) detects the physical separation of the electronic device 101 and attachment at step 703.

The method of FIG. 7 can then be executed in the reverse order to attach the electronic device 101 to the attachment 102. Beginning at step 703, as shown the electronic device 101 and attachment are physically separated from each other. In one or more embodiments, the at least two grip sensors 120,121 carried by the device housing 103 are deactivated, as are the at least two grip sensors 122,123 carried by the attachment housing 110. Thus, despite the fact that the user 704 is gripping the electronic device 101 and attachment 102 with their hands 705,706, the one or more processors (201) of the electronic device 101 and the one or more other processors (301) of the attachment 102 do not receive signals indicating this from the grip sensors.

However, in one or more embodiments the attachment sensor (210) and/or electronic device sensor (310) are active at step 703 when the method is being performed in the reverse order. At step 702, when the user 704 causes the device housing 103 and the attachment housing 110 to abut, in one or more embodiments the attachment sensor (210) and/or electronic device sensor (310) detect this. For example, where the attachment sensor (210) comprises a proximity sensor, the proximity sensor can detect, at step 702, the attachment 102 being attached to the electronic device 101 by detecting the attachment housing 110 of the attachment 102 abutting the device housing 103. The electronic device sensor (310) can function in a similar fashion.

In one or more embodiments, when this occurs, the one or more processors (201) of the electronic device 101 can transition the at least one electronic latch (209) from the unlatched state to the latched state. Additionally, the one or more other processors (301) of the attachment 102 can transition the at least one other electronic latch (309) from the unlatched state to the latched state, thereby coupling the electronic device 101 and attachment 102 together as shown at step 701. In one or more embodiments, where the at least two grip sensors 120,121 of the electronic device 101 and the at least two other grip sensors 122,123 of the attachment were deactivated, deactuated, placed into a low power mode, or placed into a sleep mode when the electronic device 101 and attachment 102 were separated at step 703 when the method was being performed in the forward order, they can be actuated, activated, or returned to a normal mode of operation at step 701 when the method is being performed in the reverse order so the process can repeat.

Thus, as shown in FIG. 7, a method includes detecting, by an attachment sensor (210) of the electronic device 101, an attachment 102 being mechanically coupled to the electronic device 101 at step 701 (forward process). The method includes detecting, by at least two grip sensors 120,121, application of a grip to the at least two grip sensors 120,121 at step 702 (forward process). The method then includes transitioning, by one or more processors (201), an electronic latch (209) from a latched state to an unlatched state when the attachment sensor (210) concurrently detects the attachment 102 being attached to the electronic device 101 when the at least two grip sensors 120,121 detect an initial application of the grip to the at least two grip sensors 120,121 at step 702 (forward process).

The method further includes detecting, by the attachment sensor (210), the attachment 102 being mechanically uncoupled from the electronic device 101 at step 703 (forward process). The method can optionally include deactuating, by the one or more processors (201), the at least two grip sensors 120,121 in response to detecting the attachment 102 being mechanically uncoupled from the electronic device 101 at step 703 (forward process).

When moving in the reverse, the method can include detecting, by the attachment sensor (210), the attachment 102 being again mechanically coupled to the electronic device 101 at step 702 (reverse process). In one or more embodiments, the method includes transitioning, by the one or more processors (201), the electronic latch (209) from the unlatched state to the latched state at step 702 (reverse process). The method can optionally include actuating, by the one or more processors (201), the at least two grip sensors 120,121 in response to detecting the attachment 102 being again mechanically coupled to the electronic device 101 at step 701 (reverse process). The attachment 102 can be operated in accordance with a similar method.

Figure 8:
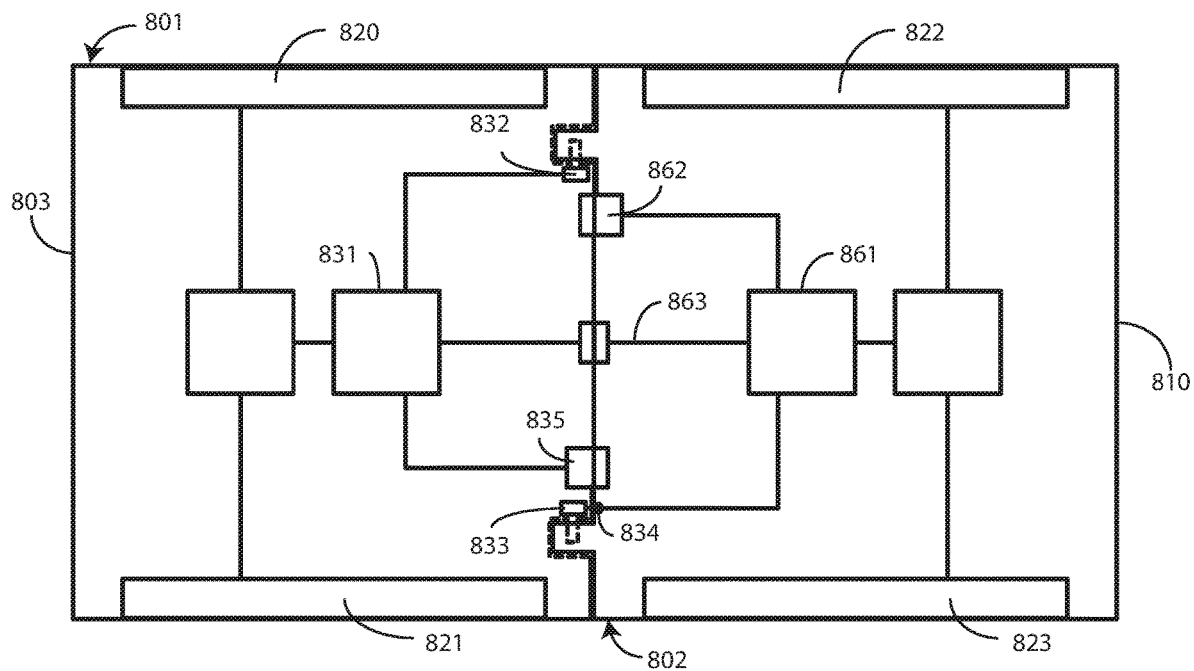
FIG. 8 illustrates a schematic block diagram of one explanatory latching system in accordance with one or more embodiments of the disclosure.
Figure 12:
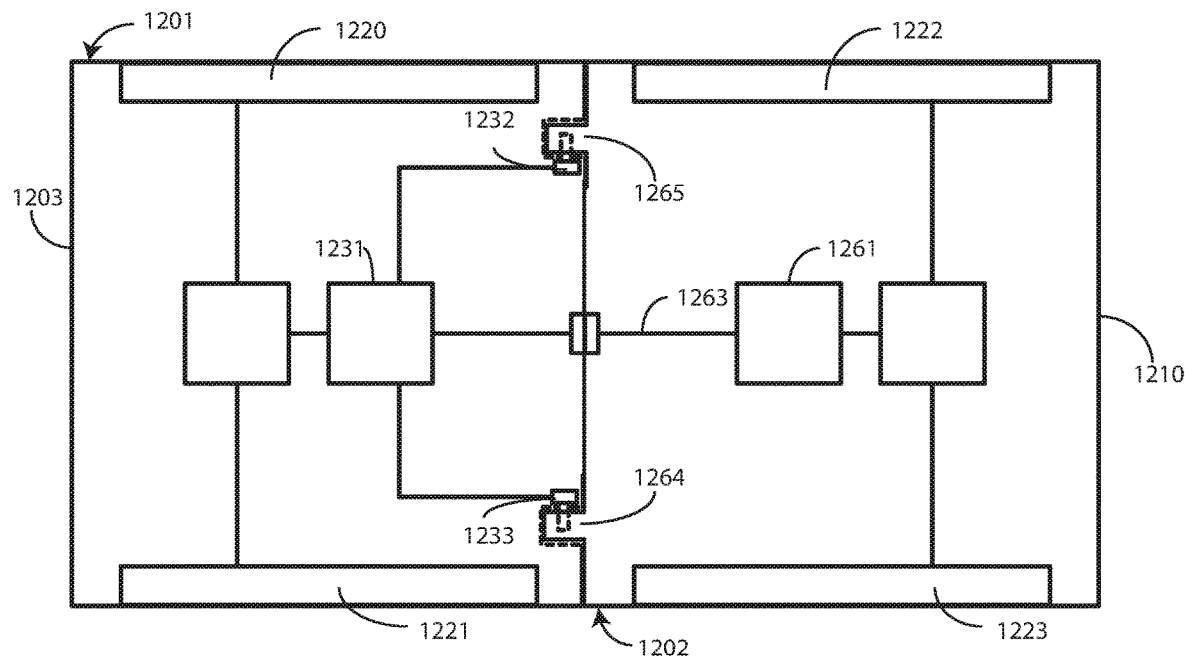
FIG. 12 illustrates another schematic block diagram of one explanatory latching system in accordance with one or more embodiments of the disclosure.
Figure 13:
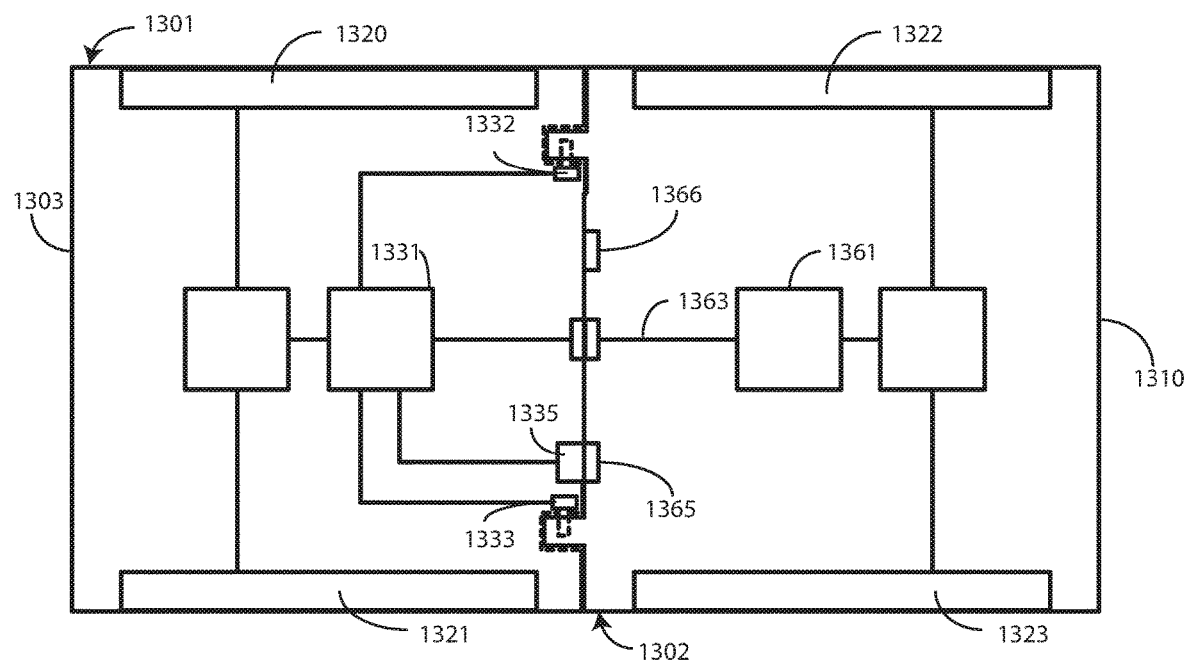
FIG. 13 illustrates still another schematic block diagram of one explanatory latching system in accordance with one or more embodiments of the disclosure.

Turning now to FIGS. 8 and 12-13, illustrated therein are different schematic representations for an electronic device and attachment configured in accordance with embodiments of the disclosure. It should be clear by now that systems including an electronic device and attachment can be configured in a variety of ways. For example, in one embodiment the electronic device carries all electronic latches, with the attachment including only latch catches or clasp catches. In another embodiment, the attachment carries all electronic latches, while the electronic device carries only latch catches or clasp catches. In other embodiments, each of the electronic device and the attachment will carry an electronic latch and a latch catch or clasp catch.

Control of the electronic latches can vary as well. In one embodiment, the one or more processors of the electronic device control all electronic latches, regardless of whether they are carried by the electronic device or the attachment. In other embodiments, the one or more other processors of the attachment will control all electronic latches, regardless of whether they are carried by the electronic device or the attachment. In still other embodiments, the one or more processors of the electronic device will control some electronic latches, while the one or more other processors control other electronic latches. Again, this configuration can occur regardless of whether they are carried by the electronic device or the attachment. Other configurations will be obvious to those of ordinary skill in the art having the benefit of this disclosure.

Beginning with FIG. 8, illustrated therein is an electronic device 801 and an attachment 802. The electronic device includes at least two grip sensors 820,821 disposed along a device housing 803 of the electronic device 801. The attachment 802 comprises at least two other grip sensors 822,823 disposed along an attachment housing 810 of the attachment 802. In the electronic device 801, one or more processors 831 are operable with the at least two grip sensors 820,821. In the attachment 802, one or more processors 861 are operable with the at least two other grip sensors 822,823. An optional communication link 863 can allow the one or more processors 831 of the electronic device 801 and the one or more other processors 861 of the attachment 802 to exchange data and other electronic signals.

In this illustrative example, the electronic device 801 carries a first electronic latch 832 and a second electronic latch 833. The first electronic latch 832 is coupled to the one or more processors 831, while the second electronic latch 833 is coupled to a control terminal 834. The control terminal 834 is coupled to the one or more other processors 861 of the attachment 802 in this illustrative embodiment. Illustrating by example, the control terminal 834 can comprise a connector carried by the device housing 803 of the electronic device 801 and another connector carried by the attachment housing 810 of the attachment 802. The connectors can couple together to define the control terminal 834 when the device housing 803 and the attachment housing 810 abut.

In one or more embodiments, the one or more processors 831 cause the first electronic latch 832 to transition from a latched state to an unlatched state when the at least two grip sensors 820,821 detect a grip applied to the at least two grip sensors 820,821. Similarly, since the second electronic latch 833 is operable with the one or more other processors 861 via the control terminal 834, in one or more embodiments the one or more other processors 861 cause the second electronic latch 833 to transition from the latched state to the unlatched state when the at least two other grip sensors 822,823 detect another grip applied to the at least two other grip sensors 822,823. This allows the electronic device 801 to be physically separated from the attachment 802. In one or more embodiments, the at least two grip sensors 820,821 and at least two other grip sensors 822,823 can optionally then be deactivated to save power.

In this illustrative embodiment, the electronic device 801 also includes an attachment sensor 835 that is operable with the one or more processors 831. In one or more embodiments, the attachment sensor 835 detects whether the attachment 802 is attached to the electronic device 801. In this illustrative embodiment, the attachment 802 includes an electronic device sensor 862 that is operable with the one or more other processors 861. The electronic device sensor 862 detects whether the electronic device 801 is attached to the attachment 802.

In one or more embodiments, the one or more processors 831 cause the first electronic latch 832 to transition from a latched state to an unlatched state only when the at least two grip sensors 820,821 detect the grip applied to the at least two grip sensors 820,821 and the attachment sensor 835 detects the attachment 802 being attached to the electronic device 801. In one or more embodiments, the one or more other processors 861 cause the second electronic latch 833 to transition from the latched state to the unlatched state only when the at least two other grip sensors 822,823 detect the another grip applied to the at least two other grip sensors 822,823 and the electronic device sensor 862 detects the electronic device 801 being attached to the attachment 802. This method can be operated in reverse to couple the electronic device 801 and attachment 802 together, as described above with reference to FIG. 7.

Turning now to FIG. 12, illustrated therein is another configuration for an electronic device 1201 and corresponding attachment 1202 configured in accordance with one or more embodiments of the disclosure. Unlike the system of FIG. 8, the system of FIG. 12 is symmetrical. This allows the attachment 1202 to be reversibly connected to electronic device 1201 such that the front side of the attachment 1202 faces in a first direction when the attachment 1202 is coupled to the electronic device 1201 in a first configuration, with that same front side facing a second direction when the attachment 1202 is coupled to the electronic device 1201 in a second configuration. Advantageously, if the front side of the attachment 1202 includes a loudspeaker, attaching the attachment 1202 to the electronic device 1201 in a first configuration allows the loudspeaker to be on the front side of the assembly, while attaching the attachment 1202 to the electronic device 1201 in a second configuration causes the loudspeaker to be on the rear side of the electronic device 1201. This reversibility allows for greater system functionality.

As before, the electronic device 1201 includes at least two grip sensors 1220,1221 disposed along a housing 1203 of the electronic device 1201. The attachment 1202 comprises at least two other grip sensors 1222,1223 disposed along a housing 1210 of the attachment 1202. In the electronic device 1201, one or more processors 1231 are operable with the at least two grip sensors 1220,1221. In the attachment 1202, one or more processors 1261 are operable with the at least two other grip sensors 1222,1223.

In the illustrative embodiment of FIG. 12, a communication link 1263 allows the one or more processors 1231 of the electronic device 1201 and the one or more other processors 1261 of the attachment 1202 to exchange data and other electronic signals. In this illustrative embodiment, the communication link 1263 serves as an attachment sensor in that the one or more processors 1231 of the electronic device 1201 detect the attachment 1202 being attached to the electronic device 1201 when the one or more other processors 1261 of the attachment 1202 to exchange data and other electronic signals. Accordingly, no other attachment sensor is required.

In this illustrative example, the electronic device 1201 carries a first electronic latch 1232 and a second electronic latch 1233. In contrast to the embodiment of FIG. 8, in FIG. 12 the first electronic latch 1232 and the second electronic latch 1233 are both coupled to, and controlled by, the one or more processors 1231. Here, the attachment 1202 carries only latch catches 1264,1265.

In one or more embodiments, the one or more processors 1231 cause the first electronic latch 1232 and the second electronic latch 1233 to transition from a latched state to an unlatched state when the at least two grip sensors 1220,1221 detect a grip applied to the at least two grip sensors 1220,1221. In one or more embodiments, the one or more processors 1231 cause the first electronic latch 1232 and the second electronic latch 1233 to transition from a latched state to an unlatched state when the at least two grip sensors 1220,1221 detect a grip applied to the at least two grip sensors 1220,1221 and the at least two other grip sensors 1222,1223 detect another grip applied to the at least two other grip sensors 1222,1223, as communicated to the one or more processors 1231 by the one or more other processors 1261 via the communication link 1263. This allows the electronic device 1201 to be physically separated from the attachment 1202. In one or more embodiments, the at least two grip sensors 1220,1221 and at least two other grip sensors 1222,1223 can optionally then be deactivated to save power. This method can be operated in reverse to couple the electronic device 1201 and attachment 1202 together, as described above with reference to FIG. 7.

Turning now to FIG. 13, illustrated therein is another configuration for an electronic device 1301 and corresponding attachment 1302 configured in accordance with one or more embodiments of the disclosure. Like the system of FIG. 12, the system of FIG. 13 is symmetrical. This allows the attachment 1302 to be reversibly connected to electronic device 1301 such that the front side of the attachment 1302 faces in a first direction when the attachment 1302 is coupled to the electronic device 1301 in a first configuration, with that same front side facing a second direction when the attachment 1302 is coupled to the electronic device 1301 in a second configuration.

The electronic device 1301 includes at least two grip sensors 1320,1321 disposed along a device housing 1303 of the electronic device 1301. The attachment 1302 comprises at least two other grip sensors 1322,1323 disposed along an attachment housing 1310 of the attachment 1302. In the electronic device 1301, one or more processors 1331 are operable with the at least two grip sensors 1320,1321. In the attachment 1302, one or more processors 1361 are operable with the at least two other grip sensors 1322,1323. An optional communication link 1363 allows the one or more processors 1331 of the electronic device 1301 and the one or more other processors 1361 of the attachment 1302 to exchange data and other electronic signals.

In this illustrative embodiment, the electronic device 1301 also includes an attachment sensor 1335 that is operable with the one or more processors 1331. In one or more embodiments, the attachment sensor 1335 detects whether the attachment 1302 is attached to the electronic device 1301. In this embodiment, the attachment sensor 1335 comprises an infrared transmitter and an infrared receiver. The infrared transmitter emits infrared light that is reflected from a reflective surface 1365 situated along a minor face of the attachment housing 1310 of the attachment 1302 or other companion device. When the infrared receiver receives this reflected infrared light, the one or more processors 1331 may conclude that the attachment 1302 is physically coupled to, or at least adjacent with, the device housing 1303 of the electronic device 1301, and so forth. To make the attachment 1302 symmetrical, the minor face of the attachment 1302 carries a first reflective surface 1365 and a second reflective surface 1366.

In this illustrative example, the electronic device 1301 carries a first electronic latch 1332 and a second electronic latch 1333. The first electronic latch 1332 and the second electronic latch 1333 are both coupled to, and controlled by, the one or more processors 1331.

In one or more embodiments, the one or more processors 1331 cause the first electronic latch 1332 and the second electronic latch 1333 to transition from a latched state to an unlatched state when the at least two grip sensors 1320,1321 detect a grip applied to the at least two grip sensors 1320,1321. In one or more embodiments, the one or more processors 1331 cause the first electronic latch 1332 and the second electronic latch 1333 to transition from a latched state to an unlatched state when the at least two grip sensors 1320,1321 detect a grip applied to the at least two grip sensors 1320,1321 and the at least two other grip sensors 1322,1323 detect another grip applied to the at least two other grip sensors 1322,1323, as communicated to the one or more processors 1331 by the one or more other processors 1361 via the communication link 1363. This allows the electronic device 1301 to be physically separated from the attachment 1302. In one or more embodiments, the at least two grip sensors 1320,1321 and at least two other grip sensors 1322,1323 can optionally then be deactivated to save power. This method can be operated in reverse to couple the electronic device 1301 and attachment 1302 together, as described above with reference to FIG. 7.

In one or more embodiments, the one or more processors 1331 cause the first electronic latch 1332 to transition from a latched state to an unlatched state only when the at least two grip sensors 1320,1321 detect the grip applied to the at least two grip sensors 1320,1321 and the attachment sensor 1335 detects the attachment 1302 being attached to the electronic device 1301. In one or more embodiments, the one or more processors 1331 cause the first electronic latch 1332 and the second electronic latch 1333 to transition from a latched state to an unlatched state when the at least two grip sensors 1320,1321 detect a grip applied to the at least two grip sensors 1320,1321 and the at least two other grip sensors 1322,1323 detect another grip applied to the at least two other grip sensors 1322,1323, as communicated to the one or more processors 1331 by the one or more other processors 1361 via the communication link 1363, in combination with the attachment sensor 1335 detecting the attachment 1302 being attached to the electronic device 1301.

Figure 14:
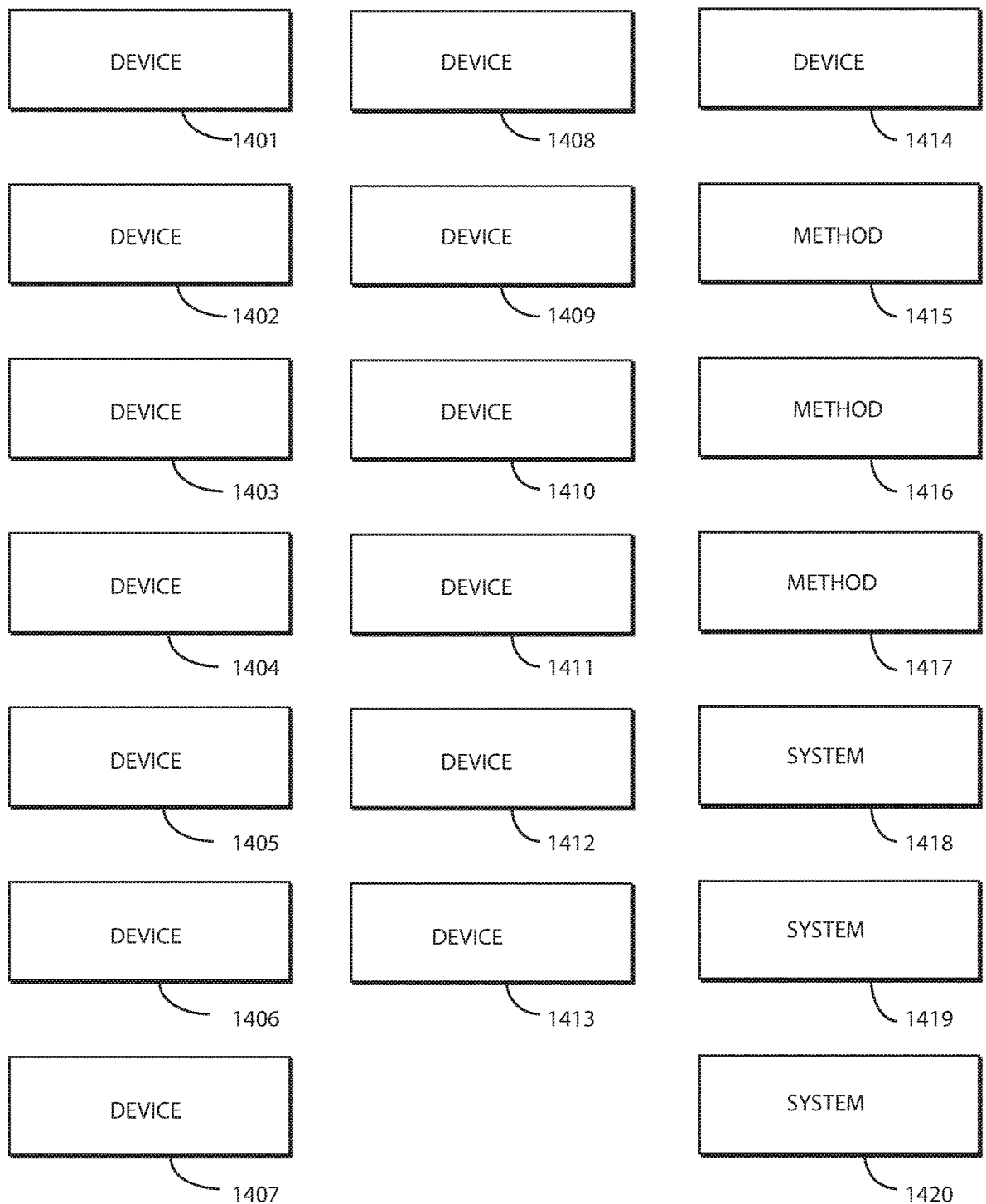
FIG. 14 illustrates various embodiments of the disclosure.

Turning now to FIG. 14, illustrated therein are various embodiments of the disclosure. At 1401, an electronic device comprises a device housing and at least two grip sensors disposed along the device housing. At 1401, the electronic device comprises one or more processors operable with the at least two grip sensors. At 1401, the electronic device comprises at least one electronic latch operable with the one or more processors. At 1401, the one or more processors transition the at least one electronic latch from a latched state to an unlatched state when the at least two grip sensors detect a grip applied to the at least two grip sensors.

At 1402, the electronic device of 140 further comprises an attachment sensor operable with the one or more processors. At 1402, the attachment sensor detects whether an attachment is attached to the electronic device.

At 1403, the one or more processors of 1402 transition the at least one electronic latch from the latched state to the unlatched state only when the attachment sensor concurrently detects an attachment being attached to the electronic device when the at least two grip sensors detect an initial application of the grip to the at least two grip sensors. At 1404, the attachment sensor of 1402 comprises a proximity sensor. At 1404, the proximity sensor detects the attachment being attached to the electronic device by detecting an attachment housing of the attachment abutting the device housing.

At 1405, the one or more processors of 1402 deactuate the at least two grip sensors when the attachment sensor detects the attachment being detached from the electronic device. At 1406, the one or more processors of 1402 transition the at least one electronic latch from the unlatched state to the latched state when the attachment sensor detects the attachment being attached to the electronic device.

At 1407, the one or more processors of 1406 actuate the at least two grip sensors when the attachment sensor detects the attachment being attached to the electronic device. At 1408, the at least two grip sensors of 1407 comprise a first grip sensor situated at a first location of the device housing and a second grip sensor situated at a second location of the device housing.

At 1409, the device housing of 1408 comprises a first minor face separated from a second minor face by a major face. At 1409, the first grip sensor spans at least a portion of the first minor face. At 1409, the second grip sensor spans at least a portion of the second minor face.

At 1410, the electronic device of 1406 further comprises the attachment. At 1410, the attachment comprises an attachment housing having at least one latch catch configured for selective engagement with the at least one electronic latch.

At 1411, the attachment of 1410 comprises at least two other grip sensors disposed along the attachment housing. At 1411, the one or more processors transition the at least one electronic latch from the latched state to the unlatched state only when the at least two grip sensors detect the grip applied to the at least two grip sensors and the at least two other grip sensors detect another grip applied to the at least two other grip sensors.

At 1412, the at least one electronic latch of 1411 comprises a first electronic latch and a second electronic latch. At 1412, the attachment comprises one or more other processors operable with the at least two other grip sensors. At 1412, the one or more processors cause the first electronic latch to transition from the latched state to the unlatched state when the at least two grip sensors detect the grip applied to the at least two grip sensors. At 1412, the one or more other processors cause the second electronic latch to transition from the latched state to the unlatched state when the at least two other grip sensors detect another grip applied to the at least two other grip sensors.

At 1413, the attachment of 1412 further comprises an electronic device sensor operable with the one or more other processors. At 1413, the one or more other processors cause the second electronic latch to transition from the latched state to the unlatched state only when the electronic device sensor concurrently detects the attachment being attached to the electronic device when the at least two other grip sensors detect an initial application of the another grip to the at least two other grip sensors.

At 1414, a method in an electronic device comprises detecting, by an attachment sensor of the electronic device, an attachment being mechanically coupled to the electronic device. At 1414, the method comprises detecting, by at least two grip sensors, application of a grip to the at least two grip sensors. At 1414, the method comprises transitioning, by one or more processors, an electronic latch from a latched state to an unlatched state when the attachment sensor concurrently detects the attachment being attached to the electronic device when the at least two grip sensors detect an initial application of the grip to the at least two grip sensors.

At 1415, the method of 1414 comprises detecting, by the attachment sensor, the attachment being mechanically uncoupled from the electronic device. At 1415, the method of 1414 comprises deactuating, by the one or more processors, the at least two grip sensors in response to detecting the attachment being mechanically uncoupled from the electronic device.

At 1416, the method of 1414 comprises detecting, by the attachment sensor, the attachment being again mechanically coupled to the electronic device. At 1416, the method of 1414 comprises transitioning, by the one or more processors, the electronic latch from the unlatched state to the latched state. At 1417, the method of 1416 comprises actuating, by the one or more processors, the at least two grip sensors in response to detecting the attachment being again mechanically coupled to the electronic device.

At 1418, a system comprises an electronic device and an attachment. At 1418, the electronic device comprises at least two grip sensors disposed along a housing of the electronic device. At 1418, the electronic device comprises one or more processors operable with the at least two grip sensors. At 1418, the electronic device comprises a first electronic latch operable with the one or more processors and a second electronic latch coupled to a control terminal.

At 1418, the attachment comprises at least two other grip sensors disposed along a housing of the attachment. At 1418, the attachment comprises at least one or more other processors operable with the at least two other grip sensors and coupled to the control terminal.

At 1418, the one or more processors cause the first electronic latch to transition from a latched state to an unlatched state when the at least two grip sensors detect a grip applied to the at least two grip sensors. At 1418, the one or more other processors cause the second electronic latch to transition from the latched state to the unlatched state when the at least two other grip sensors detect another grip applied to the at least two other grip sensors.

At 1419, the electronic device of 1418 comprises an attachment sensor operable with the one or more processors. At 1419, the attachment sensor detects whether the attachment is attached to the electronic device. At 1419, the attachment of 1418 comprises an electronic device sensor operable with the one or more other processors. At 1418, the electronic device sensor detects whether the electronic device is attached to the attachment.

At 1420, the one or more processors of 1418 cause the first electronic latch to transition from a latched state to an unlatched state only when the at least two grip sensors detect the grip applied to the at least two grip sensors and the attachment sensor detects the attachment being attached to the electronic device. At 1420, the one or more other processors of 1418 cause the second electronic latch to transition from the latched state to the unlatched state only when the at least two other grip sensors detect the another grip applied to the at least two other grip sensors and the electronic device sensor detects the electronic device being attached to the attachment.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a device housing and at least two grip sensors disposed along the device housing;
   an attachment sensor positioned on a minor face of the electronic device and configured to detect whether an attachment is coupled to the minor face of the electronic device by detecting light emitted by the attachment sensor reflective from a reflective surface situated on the attachment when the reflective surface is abutting the attachment sensor;
   one or more processors operable with the at least two grip sensors; and
   at least one electronic latch operable with the one or more processors;
   the one or more processors transitioning the at least one electronic latch from a latched state to an unlatched state by causing translation of a bolt of the at least one electronic latch through a bolt receiver of the attachment when the at least two grip sensors detect a grip applied to the at least two grip sensors and the attachment sensor detects the light reflecting from the reflective surface.

2. The electronic device of claim 1, the attachment sensor comprising a transmitter emitting the light and a receiver receiving the light after reflection from the reflective surface.

3. The electronic device of claim 1, the one or more processors transitioning the at least one electronic latch from the latched state to the unlatched state only when the attachment sensor concurrently detects the attachment being attached to the electronic device when the at least two grip sensors detect an initial application of the grip to the at least two grip sensors.

4. The electronic device of claim 1, the light comprising infrared light.

5. The electronic device of claim 1, the one or more processors deactuating the at least two grip sensors when the attachment sensor detects the attachment being detached from the electronic device.

6. The electronic device of claim 1 the one or more processors transitioning the at least one electronic latch from the unlatched state to the latched state when the attachment sensor detects the attachment being attached to the electronic device.

7. The electronic device of claim 6, the one or more processors actuating the at least two grip sensors when the attachment sensor detects the attachment being attached to the electronic device.

8. The electronic device of claim 7, the at least two grip sensors comprising a first grip sensor situated at a first location of the device housing and a second grip sensor situated at a second location of the device housing.

9. The electronic device of claim 8, the device housing comprising at least two other minor faces separated by a major face, the first grip sensor spanning at least a portion of one of the at least two other minor faces, and the second grip sensor spanning at least a portion of another of the at least two other minor faces.

10. The electronic device of claim 6, further comprising the attachment, the attachment comprising an attachment housing having at least one latch catch configured for selective engagement with the at least one electronic latch.

11. The electronic device of claim 10, the attachment comprising at least two other grip sensors disposed along the attachment housing, the one or more processors transitioning the at least one electronic latch from the latched state to the unlatched state only when the at least two grip sensors detect the grip applied to the at least two grip sensors and the at least two other grip sensors detect another grip applied to the at least two other grip sensors.

12. The electronic device of claim 11, wherein:
   the at least one electronic latch comprises a first electronic latch and a second electronic latch;
   the attachment comprises one or more other processors operable with the at least two other grip sensors;
   the one or more processors causing the first electronic latch to transition from the latched state to the unlatched state when the at least two grip sensors detect the grip applied to the at least two grip sensors; and
   the one or more other processors causing the second electronic latch to transition from the latched state to the unlatched state when the at least two other grip sensors detect another grip applied to the at least two other grip sensors.

13. The electronic device of claim 12, the attachment further comprising an electronic device sensor operable with the one or more other processors, the one or more other processors causing the second electronic latch to transition from the latched state to the unlatched state only when the electronic device sensor concurrently detects the attachment being attached to the electronic device when the at least two other grip sensors detect an initial application of the another grip to the at least two other grip sensors.

14. A method in an electronic device, the method comprising:
   detecting, by an attachment sensor positioned on a minor face of the electronic device, an attachment being mechanically coupled to the minor face of the electronic device by detecting light emitted by the attachment sensor reflecting from a reflective surface situated on a minor face of the attachment and abutting the attachment sensor;

detecting, by at least two grip sensors, application of a grip to the at least two grip sensors; and transitioning, by one or more processors, an electronic latch positioned on the minor face of the electronic device from a latched state to an unlatched state by causing a bolt of the electronic latch to pass through a bolt receiver of a latch catch positioned on the minor face of the attachment when the attachment sensor concurrently detects the light reflecting from the reflective surface after the at least two grip sensors detect an initial application of the grip to the at least two grip sensors.

15. The method of claim 14, wherein the detecting the attachment being mechanically coupled to the electronic device further comprises the attachment sensor delivering the light to the reflective surface from an off-center location on the minor face of the electronic device, wherein the reflective surface comprises one reflective surface of two reflective surfaces each positioned an off-center locations along the minor face of the attachment, each situated equidistant from a center of the minor face of the attachment.

16. The method of claim 14, wherein the detecting the attachment being mechanically coupled to the electronic device further comprises the attachment sensor delivering the light from an off-center location of the minor face of the electronic device situated between the electronic latch and another electronic latch positioned on the minor face of the electronic device.

17. The method of claim 16, further comprising receiving, with a communication link positioned on the minor face of the electronic device, data from the attachment.

18. A system, comprising:
an electronic device comprising:
at least two grip sensors disposed along a housing of the electronic device;
an attachment sensor positioned on a minor face of the housing of the electronic device;
one or more processors operable with the at least two grip sensors; and
a first electronic latch operable with the one or more processors, comprising a bolt, and a second electronic latch coupled to a control terminal; and an attachment comprising:
at least two other grip sensors disposed along a housing of the attachment;
a reflective surface situated on a minor face of the attachment;
at least one or more other processors operable with the at least two other grip sensors and coupled to the control terminal; and
a latch catch defining a bolt receiver;

the one or more processors causing the first electronic latch to transition from a latched state to an unlatched state by causing the bolt of the first electronic latch to pass through the bolt receiver when:
the at least two grip sensors detect a grip applied to the at least two grip sensors; and
the attachment sensor detects light reflecting from the reflective surface when the minor face of the attachment abuts the minor face of the electronic device.

19. The system of claim 18, the attachment comprising an electronic device sensor operable with the one or more other processors, the electronic device sensor detecting whether the electronic device is attached to the attachment.

20. The system of claim 19, wherein:
the one or more other processors cause the second electronic latch to transition from the latched state to the unlatched state when the at least two other grip sensors detect another grip applied to the at least two other grip sensors and the electronic device sensor detects the electronic device being attached to the attachment.

\* \* \* \* \*